United States Patent
Jaaskelainen

(10) Patent No.: US 10,550,654 B2
(45) Date of Patent: Feb. 4, 2020

(54) DOWNHOLE ACTIVATION OF SEISMIC TOOLS

(71) Applicant: Halliburton Energy Services, Inc., Houston, TX (US)

(72) Inventor: Mikko Jaaskelainen, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 210 days.

(21) Appl. No.: 15/546,611

(22) PCT Filed: Feb. 26, 2015

(86) PCT No.: PCT/US2015/017706
§ 371 (c)(1),
(2) Date: Jul. 26, 2017

(87) PCT Pub. No.: WO2016/137465
PCT Pub. Date: Sep. 1, 2016

(65) Prior Publication Data
US 2018/0010407 A1    Jan. 11, 2018

(51) Int. Cl.
| | | |
|---|---|---|
| *G01V 1/52* | (2006.01) | |
| *E21B 23/01* | (2006.01) | |
| *E21B 17/10* | (2006.01) | |
| *G01V 11/00* | (2006.01) | |
| *E21B 33/14* | (2006.01) | |
| *E21B 49/00* | (2006.01) | |

(52) U.S. Cl.
CPC .......... *E21B 23/01* (2013.01); *E21B 17/1021* (2013.01); *E21B 33/14* (2013.01); *E21B 49/00* (2013.01); *G01V 1/52* (2013.01); *G01V 11/005* (2013.01); *G01V 2001/526* (2013.01)

(58) Field of Classification Search
CPC .......... E21B 23/01; G01V 1/52; G01V 11/005
See application file for complete search history.

(56) References Cited

U.S. PATENT DOCUMENTS

| | | | | |
|---|---|---|---|---|
| 4,428,422 A | * | 1/1984 | Laurent | E21B 17/1021 166/212 |
| 4,557,326 A | * | 12/1985 | Bogard | E21B 23/04 166/104 |
| 4,805,725 A | | 2/1989 | Paulsson | |
| 6,170,601 B1 | | 1/2001 | Nakajima et al. | |

(Continued)

OTHER PUBLICATIONS

International Search Report and Written Opinion issued in corresponding application No. PCT/US2015/017706 dated Oct. 29, 2015, 11 pgs.

*Primary Examiner* — Kenneth L Thompson
(74) *Attorney, Agent, or Firm* — Chamberlain Hrdlicka

(57) ABSTRACT

A well tool for sensing seismic activity at a downhole location has an anchoring mechanism for mechanically coupling the tool to a formation by contact engagement with a wall of a subterranean cavity in which the well tool is located. The anchoring mechanism is deployable by a pressure-triggered hydraulic actuator incorporated in the tool. The actuator is configured for pressure-triggered activation and for hydraulic actuation by agency of borehole fluids (e.g., drilling mud). The actuator can provide a persistent contacting force urging the anchoring mechanism into contact with the cavity wall, to promote firm coupling with the formation for seismic sensing purposes.

20 Claims, 18 Drawing Sheets

(56) References Cited

U.S. PATENT DOCUMENTS

| | | | | |
|---|---|---|---|---|
| 7,187,620 | B2* | 3/2007 | Nutt | G01V 1/40 |
| | | | | 166/66 |
| 7,562,740 | B2* | 7/2009 | Ounadjela | G01V 1/143 |
| | | | | 181/113 |
| 9,188,698 | B2* | 11/2015 | Tashiro | G01V 11/005 |
| 2004/0035635 | A1 | 2/2004 | Rueter | |
| 2006/0131015 | A1* | 6/2006 | Kanayama | G01V 11/005 |
| | | | | 166/254.2 |
| 2006/0168955 | A1 | 8/2006 | Longfield et al. | |
| 2013/0315032 | A1 | 11/2013 | Kamata et al. | |
| 2014/0246210 | A1* | 9/2014 | Andersen | E21B 23/01 |
| | | | | 166/377 |
| 2016/0010410 | A1* | 1/2016 | Fradkin | G01V 1/22 |
| | | | | 166/373 |

* cited by examiner

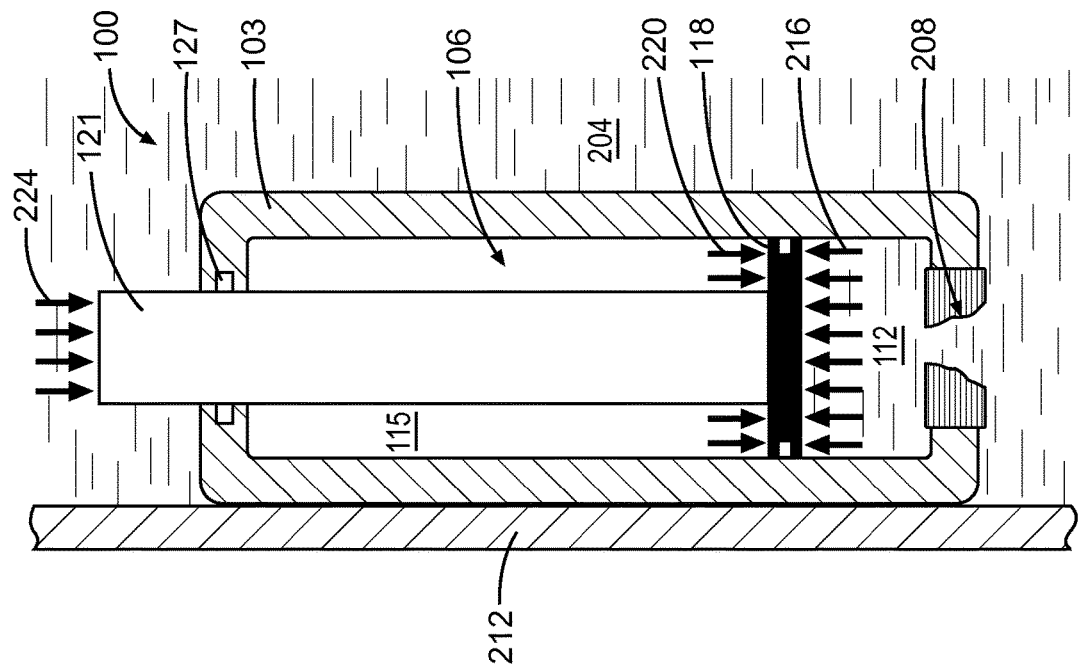
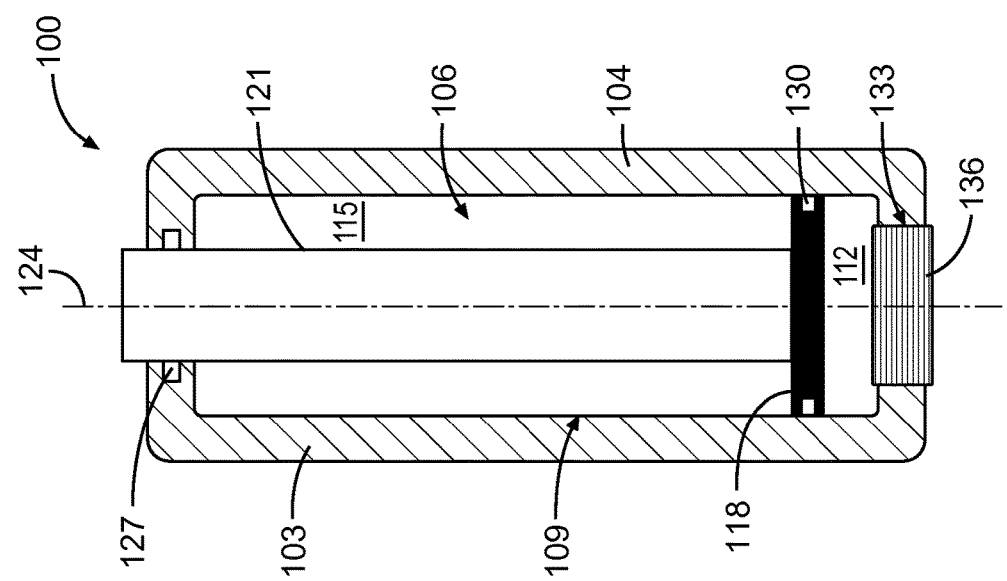

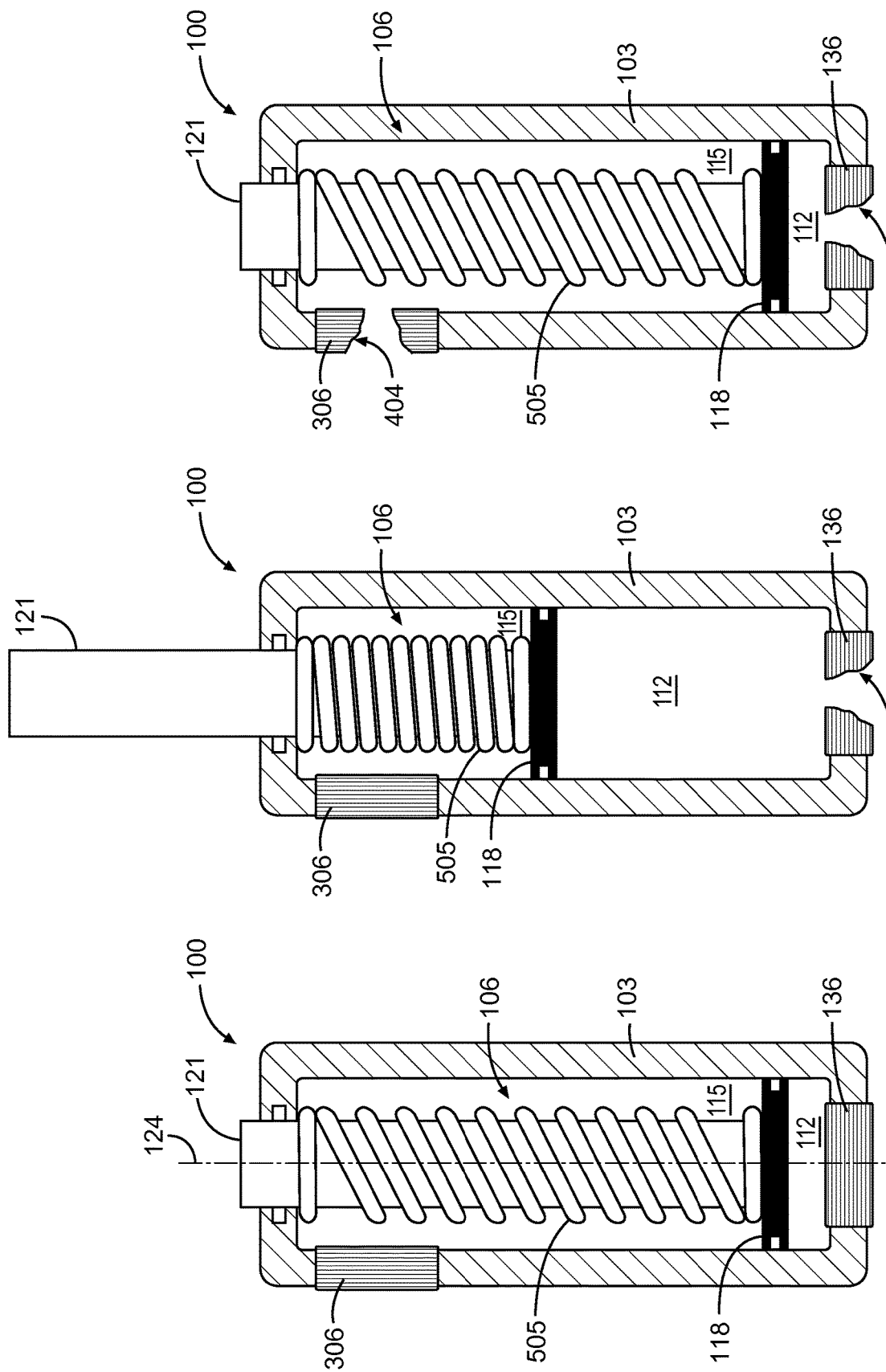

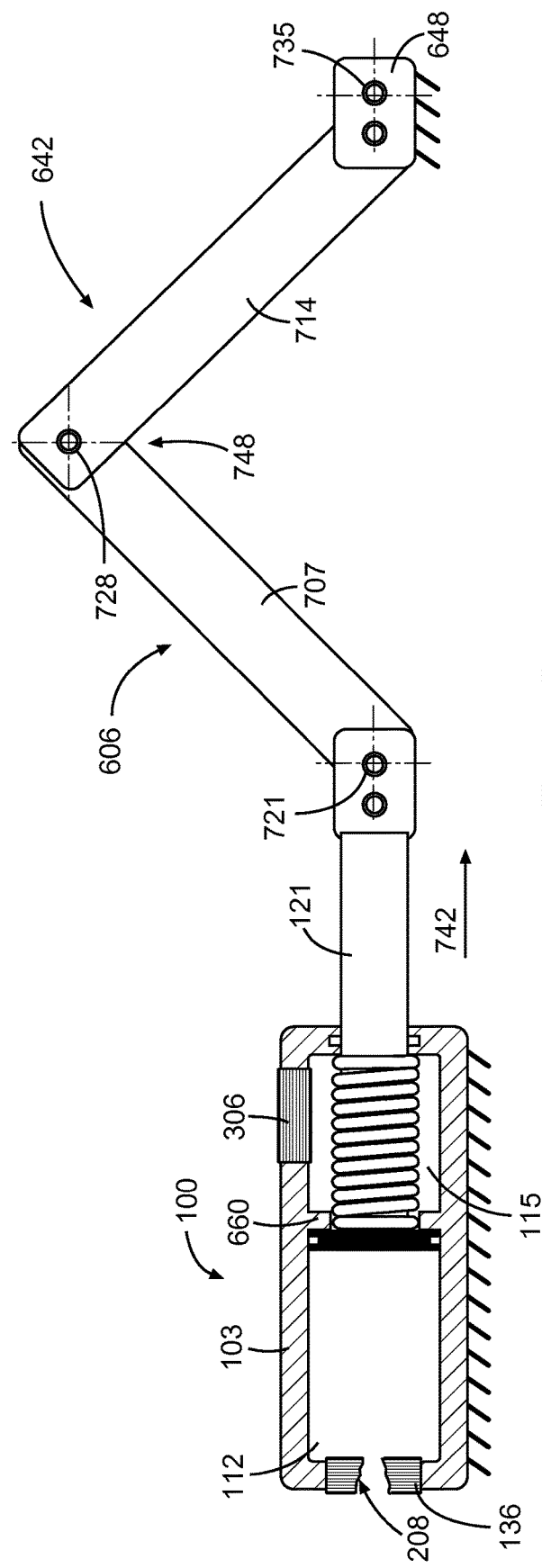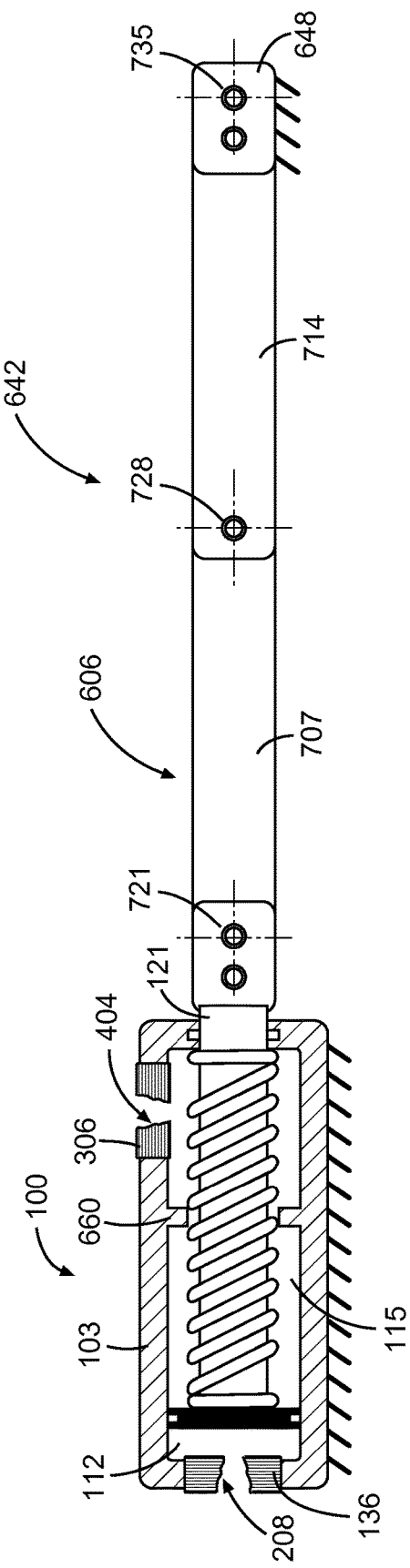
Fig. 7B
Fig. 7C

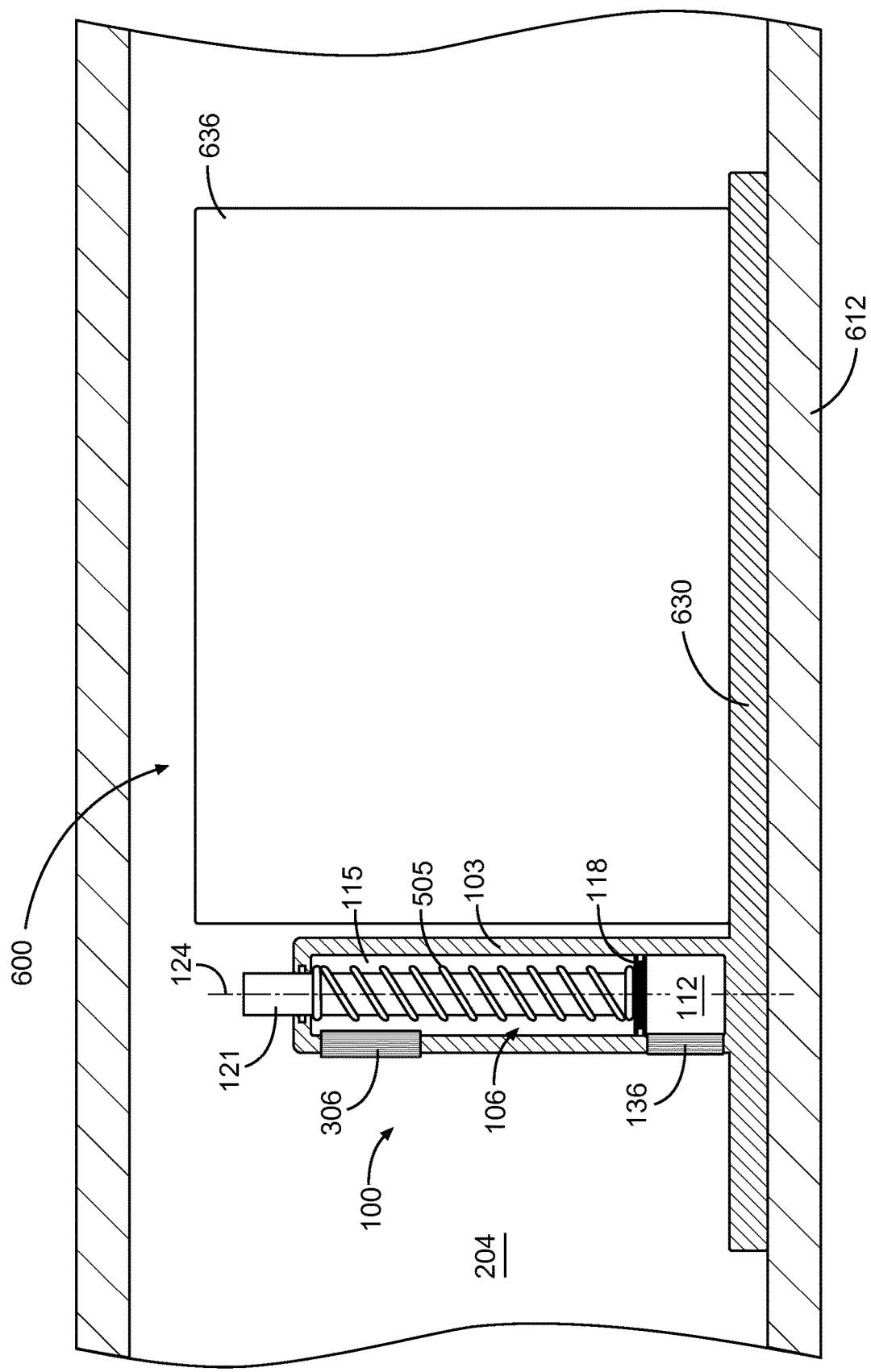

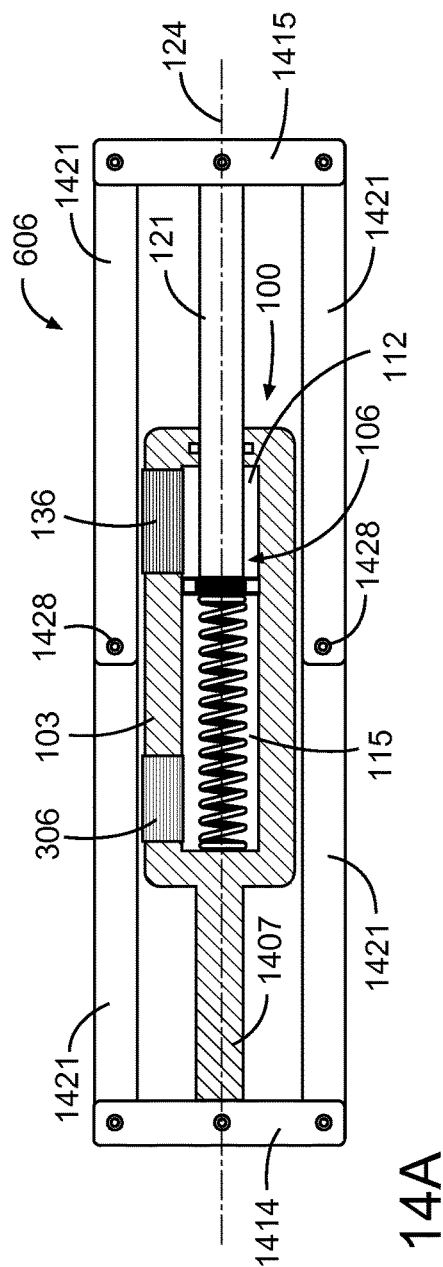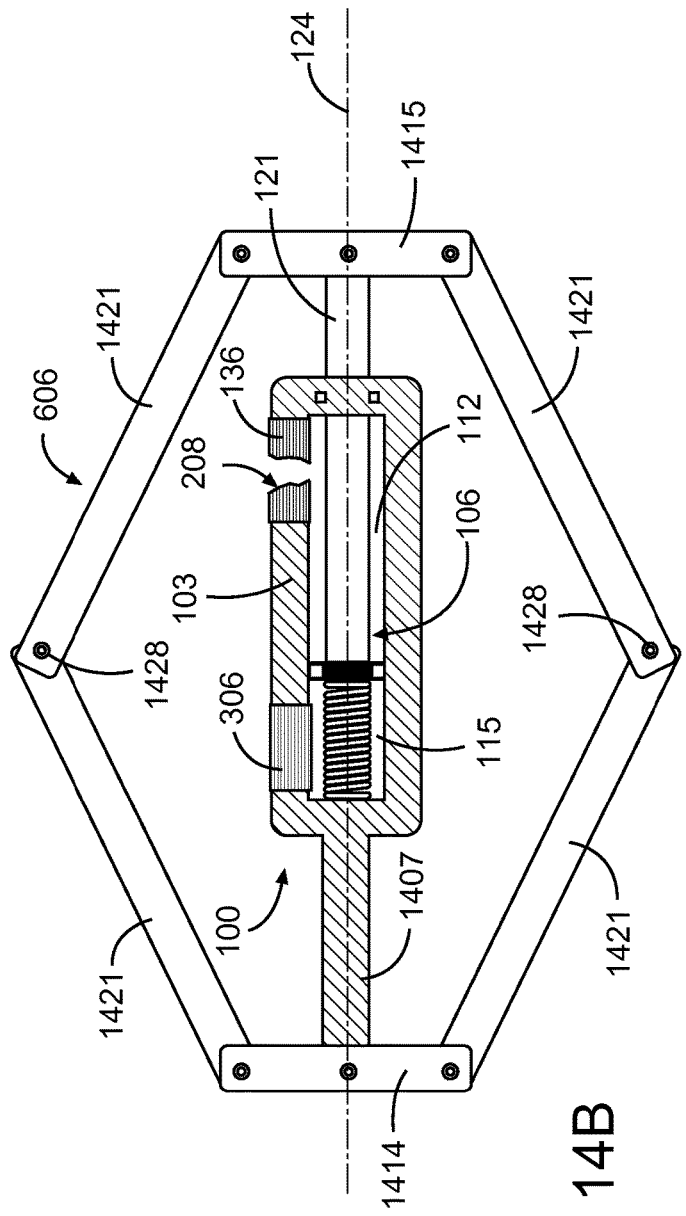
Fig. 14A
Fig. 14B

DOWNHOLE ACTIVATION OF SEISMIC TOOLS

BACKGROUND

Seismic tools are often used to capture information about seismic activity by positioning the seismic tool in a subterranean borehole or well. For accurate seismic measurement, the seismic tools are mechanically coupled to the formation/reservoir downhole by establishing firm contact with a borehole wall or other structure exposed seismic activity in the formation.

Seismic tools are often tractored into horizontal wells, with gravity being employed for coupling the sensor to the wellbore. These tractors are powered by conductors in a cable, with the available power being limited by conductors and cable length. The use of heavier seismic tools, for enhanced gravitational coupling, is problematic with respect to energy and space limitations in the downhole environment.

Some seismic tools use motors to engage locking arms that coupled to the formation, but the use of such systems can be frustrated by complications associated with power supply and machine control.

BRIEF DESCRIPTION OF THE DRAWINGS

Some embodiments of the disclosure are illustrated by way of example and not limitation in the figures of the accompanying drawings, in which:

FIG. 1 depicts a schematic view in axial section of an actuator for a seismic tool, in accordance with an example embodiment, the actuator being in an initial dormant condition.

FIG. 2 depicts a schematic axial section of part of a downhole seismic sensor tool that includes an actuator in accordance with an example embodiment of FIG. 1, the actuator being shown during actuated deployment of the tool resulting from failure of a frangible closure member which initially isolates an activation chamber of the actuator from pressurized ambient drilling fluid.

FIGS. 5A-5C depict schematic axial sections of an actuator for a seismic sensor in accordance with another example embodiment, depicting the actuator in a dormant condition, an activated condition, and a deactivated condition, respectively.

FIGS. 7A-7C depict a series of schematic axial sections of an anchoring mechanism for a seismic sensor such as that of FIG. 6, the anchoring mechanism being shown in a dormant condition, an activated condition, and a deactivated condition, respectively.

FIGS. 12A-12C depict a series of schematic axial sections of a seismic sensor having a hydraulically actuated anchoring mechanism in accordance with a further example embodiment, depicting the anchoring mechanism in a dormant condition, an activated condition, and a deactivated condition, respectively.

FIGS. 14A-14B depict a series of schematic axial sections of an anchoring mechanism for a seismic sensor tool in accordance with yet a further example embodiment, the anchoring mechanism being shown in a dormant condition and in an activated condition, respectively.

DETAILED DESCRIPTION

Figure 4:
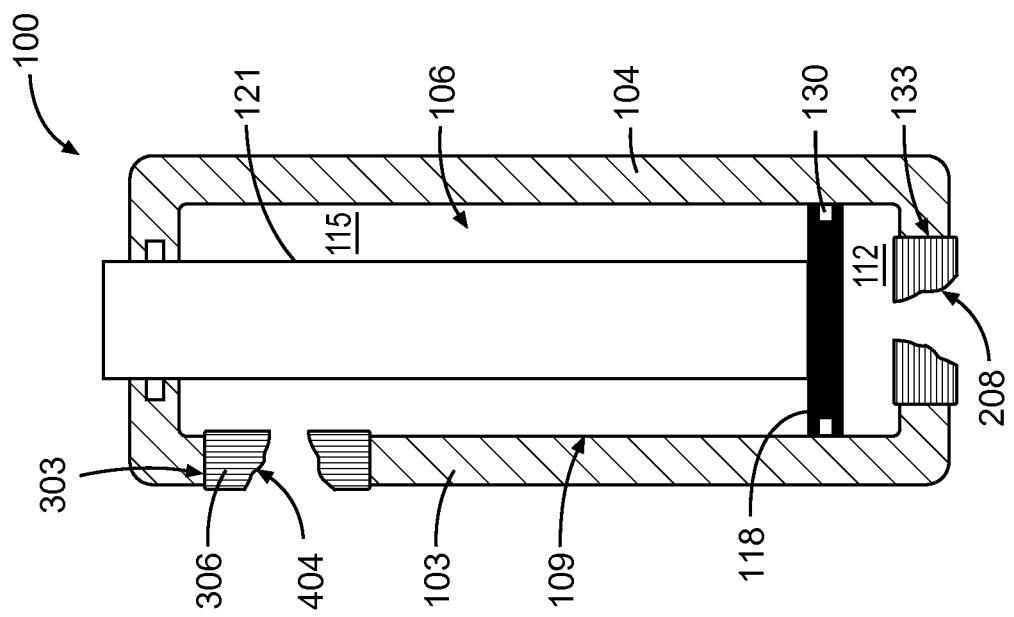
FIG. 4 depicts a schematic axial section of an actuator similar to the example embodiment of FIG. 3, the actuator being sown in a deactivated condition in which hydraulic actuation of the plunger of the actuator has been deactivated through operation of a pressure-controlled deactivation mechanism.

The following detailed description refers to the accompanying drawings that depict various details of examples selected to show how aspects of this disclosure may be practiced. The discussion addresses various examples of the disclosure at least partially in reference to these drawings, and describes the depicted embodiments in sufficient detail to enable those skilled in the art to practice the subject matter disclosed herein. Many other embodiments may be utilized for practicing the disclosure other than the illustrative examples discussed herein, and structural and operational changes in addition to the alternatives specifically discussed herein may be made without departing from the scope of the disclosure.

In this description, references to "one embodiment" or "an embodiment," or to "one example" or "an example," are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, and all legal equivalents of such claims.

One aspect of the disclosure comprises a seismic tool having an anchoring mechanism for mechanically coupling the tool to a formation or structure in a subterranean cavity, the anchoring mechanism being deployable by a pressure-triggered hydraulic actuator incorporated in the tool. The actuator is configured for pressure-triggered activation and for hydraulic actuation by agency of borehole fluids (e.g., drilling mud).

The anchoring mechanism made some embodiments be configured to both provide a mechanical contact coupling to the formation for seismic measurement purposes, and to secure the tool in position within the borehole to resist movement thereof along the borehole. In some embodiments, however, the anchoring mechanism may be configured to serve primarily for mechanical coupling purposes.

The anchoring mechanism may include a mechanical linkage which is connected to the actuator for deployment by the actuator, thereby to establish contact engagement with a cavity wall that defines a subterranean cavity in which the tool is located. The actuator may be configured to provide a persistent contacting force urging the anchoring mechanism into contact with the cavity wall, to promote firm coupling with the formation.

The actuator may be a single-use pressure-controlled actuator configured for activation/deactivation control and actuation by agency of wellbore fluid pressure exclusively (e.g., by pressure levels of drilling fluid or drilling mud in the wellbore). Such constructions allows for deployment and control of the seismic tool without provision of power and/or control cables or wires. The actuator may be configured for activation by increasing wellbore fluid pressure above a predetermined threshold level.

In some embodiments, the actuator comprises a plunger displaceably mounted on a sealed cylinder body, with a non-reclosable frangible device closing off wellbore fluid access to an interior of the cylinder body, the frangible device being configured for automatic failure in response to exposure of wellbore fluid pressures exceeding a predetermined activation threshold, thereafter to allow flow of wellbore fluid into the cylinder body for causing actuated movement of the plunger by hydraulic action of the wellbore fluid. In some embodiments, the actuator may further comprise a deactivation mechanism for pressure-controlled deactivation of the actuator subsequent to pressure-triggered activation. The deactivation mechanism may comprise a second non-reclosable frangible device sealingly closing off wellbore fluid access to a compression chamber within the cylinder body, the second frangible device being configured for automatic failure in response to exposure to wellbore fluid pressures exceeding a predefined deactivation threshold, thereafter to allow equalization of fluid pressures across a plunger head within the cylinder body.

In FIG. 1, reference numeral 100 generally indicates an actuator that provides an actuator forming part of a downhole seismic tool in accordance with one example embodiment of the disclosure, the actuator being configured for pressure-activated downhole actuation. The actuator 100 includes a dashpot-type mechanism comprising a housing 103 containing an actuated member in the form of a plunger 106 that is displaceable relative to the housing 103 by hydraulic action, piston/cylinder-fashion. As will be described in greater depth later herein, the actuator 100 is configured for use in a wellbore environment in which it is exposed to pressurized ambient wellbore fluid (see, e.g. FIG. 6), for example embodiment being exposed to drilling fluid 204 (see FIG. 2), also referred to as drilling mud.

The housing 103 in this example embodiment comprises a cylinder broadly similar in construction to a pressure vessel, having a circular cylindrical cylinder wall 104 of substantially constant thickness. The cylinder wall 104 defines a hollow interior defining a cylinder volume 109. In this example embodiment, the cylinder volume 109 is a generally circular cylindrical space extending along a longitudinal axis 124 of the housing 103. The cylinder wall 104 may be of sheet metal, in this example embodiment being of mild steel.

The housing 103 defines a deployment or activation port 133 that comprises an opening extending through the cylinder wall 104 at one of its ends, thereby providing a fluid passage or fluid conduit to that, when unoccluded, establishes a flow connection between the interior cylinder volume 109 and the exterior of the housing 103. The housing 103 forms part of a housing assembly that also includes a non-reclosable frangible closure device in the example form of an activation rupture disc 136 sealingly mounted in the activation port 133. As will be described in greater detail below, the activation rupture disc 136 is operable between (a) an initial intact condition or closed state (shown in FIG. 1) in which the activation rupture disc 136 sealingly closes off the activation port 133 to prevent the flow of ambient drilling fluid 204 into the cylinder volume 109, and (b) a ruptured condition or opened state (shown in FIG. 2) in which the activation rupture disc 136 has failed owing to above-threshold fluid pressure conditions across it, thereby allowing passage of pressurized ambient drilling fluid 204 through the activation port 133 (via an opening or rupture 208 in the activation rupture disc 136).

The rupture disc 136 is in this example embodiment a commercially available rupture disc, but may in other embodiments be custom manufactured specifically for the disclosed applications. Commercially available rupture discs (also known as a burst discs, bursting discs, or burst diaphragms), are non-re-closing pressure relief devices that, in most uses, protect a pressure vessel, equipment or system from over-pressurization or potentially damaging vacuum conditions. Rupture discs are typically sacrificial parts, because of their one-time-use time use membrane that fails at a predetermined differential pressure across the device. The membrane is usually made of metal, but nearly any material (or different materials and layers) can be used to suit a particular application. Rupture discs provide substantially instant response (within milliseconds) to system pressure, but once the disc has ruptured, it will not reseal. Although commonly manufactured in disc form, and employed has such in the example embodiments described herein as such, the devices are also available as rectangular panels.

In this example embodiment, the activation rupture disc 136 is removably and replaceably mounted on the housing 103. Removable and replaceable mounting is effected by complementary screw threads on a radially outer periphery of the rupture disc and on a radially inner periphery of the activation port 133, respectively. The housing 103 thus provides a mounting formation for removable and replaceable semi-permanent mounting of the activation rupture disc 136, the port 133 this example being a circular cylindrical screw-threaded passage or conduit extending through the cylinder wall 104.

The plunger 106 comprises a plunger head 118 sealingly located in the cylinder volume 109 for hydraulically actuated axial displacement along the cylinder volume 109. In this example embodiment, the plunger head 118 is a disc-shaped element oriented perpendicularly relative to the cylinder axis 124. A radially outer periphery of the plunger head 118 is in sliding sealed engagement with an inner cylindrical surface of the cylinder wall 104 by means of a seal 130 (e.g., comprising an O-ring) in contact with the inner diameter of the cylinder wall 104.

The plunger head 118 thus sealingly separates the cylinder volume 109 into two distinct but complementary volumes whose capacities are complementarily or sympathetically variable in response to axial movement of the plunger head 118. In this example embodiment, the complementarily variable volumes that together make up the cylinder volume 109 are identified as an activation chamber 112 and a compression chamber 115. These chambers are here distinguished by the fact that the activation port 133 provides a flow connection (when the activation rupture disc 136 is omitted or has ruptured, thus being in its opened state) between the exterior of the housing 103 and the activation chamber 112. Note that, in this example embodiment, location of the activation port 133 on an end wall of the housing 103 ensures that the activation port 133 is in flow connection with the activation chamber 112, regardless of the axial position of plunger head 118.

In contrast, the compression chamber 115 is in this example embodiment not in fluid communication with any flow passage or opening of that connects it to the exterior of the housing 103, thus being in permanent fluid isolation.

A force transmission component or coupling member connected to the plunger head 118 is in this example embodiment provided by a plunger rod 121 that extends axially along the compression chamber 115 and through a complementary opening in a corresponding end wall of the housing 103, projecting from the end of housing 103. An outer end of the plunger rod 121 is thus, in use, exposed to ambient drilling fluid 204. A fluid seal 127 is provided at the end wall opening through which the plunger rod 121 extends, to sealingly engage with the periphery of the plunger rod 121 and prevent fluid flow into or out of the compression chamber 115 through the end wall.

In an initial dormant condition (in which the actuator 100 is to be conveyed downhole for in situ deployment), the cylinder volume 109 is filled with a compressible fluid. In some embodiments, the compression chamber 115 and/or the activation chamber 112 may contain air. In other embodiments, the chambers of the cylinder volume 109 may be filled with an inert or noncorrosive gas, thereby to promote reliability and longevity of components exposed thereto, such as the seals and the interior surfaces of the housing 103. In this example embodiment, the activation chamber 112 and the compression chamber 115 are each initially charged with nitrogen. Although the chambers 112, 115 are in the described example embodiment pressurized at more or less equal to atmospheric pressure, higher initial gas pressures may in other embodiments be employed. A benefit of initially charging both of these volumes with gas at atmospheric pressure is that there is no net hydraulic force on the plunger 106 when the actuator 100 is located above ground, at atmospheric pressure.

Pressure-controlled activation of the actuator 100 to cause hydraulic actuation of the plunger 106 (in this example embodiment to deploy the plunger rod 121) will now be described with reference to FIG. 2, which shows the housing 103 located in a drilling environment in which it is exposed to ambient drilling fluid 204. The housing 103 is mounted to a frame of a seismic sensing tool 200 of which the actuator 100 forms part, the frame in the illustrated instance being provided by baseplate 212.

As mentioned above, the actuator 100 is moved into position in the downhole environment in an initial dormant condition (shown in FIG. 1) in which the activation rupture disc 136 is intact, so that the activation chamber 112 is a gas-filled volume which is in fluid isolation from the ambient drilling fluid 204. Note that increases in fluid pressure of the drilling fluid 204 (but not so high as to exceed the predetermined activation pressure of the activation rupture disc 136) may cause some compression of the activation chamber 112. This is because net axial fluid pressure forces acting to compress the compression chamber 115 (schematically indicated by arrows 216 in FIG. 2) are substantially limited to gas in the activation chamber 112 acting on a circular end face of the plunger head 118, while net axial fluid pressure forces acting on the plunger 106 to compress the activation chamber 112 arise not only from gas in the compression chamber 115 acting on an annular surface of the plunger head 118 (indicated by arrows 220), but also include fluid pressure exerted by the ambient drilling fluid 204 on an axial end face of the plunger rod 121 (indicated by arrows 224) which is located outside the housing 103 and is thus exposed to the drilling fluid 204. When the ambient drilling fluid 204 is at a notably higher pressure than the gas in the cylinder volume 109, the plunger head 118 will automatically find a point of equilibrium in which the activation chamber 112 is somewhat more compressed than at the surface. These fluid mechanics beneficially serve to retain the plunger 106 more or less in its dormant, retracted position corresponding to the initial dormant condition of the actuator 100.

When, however, ambient fluid pressure exceeds a predetermined activation threshold, the activation rupture disc 136 fails automatically, causing hydraulically actuated deployment of the plunger rod 121, as will be described below. Note that elevation of the drilling fluid pressure to exceed the activation threshold may be effected in some instances by locating of the actuator 100 is at a fixed downhole position, and thereafter ramping up the ambient fluid pressure bias via an operator-controlled wellbore pressure control system (such as that provided, for example, by a wellbore pumping system as described with reference to FIG. 8). In other instances, the activation pressure may be calculated (and the activation rupture disc 136 may be selected with a matching pressure rating) to correspond to a particular target depth in a drilling installation. In this manner, the actuator 100 may be lowered to the target depth, with the actuator 100 automatically activating at the target depth.

In FIG. 2, the actuator 100 is shown during switching thereof from the initial dormant condition to a deployed condition, subsequent to failure of the activation rupture disc 136 caused by above-threshold drilling fluid conditions. When the activation rupture disc 136 fails, a rupture 208 is opened in the activation rupture disc 136 located in the activation port 133. Due to its exposure to the ambient drilling fluid pressure via the rupture 208, the activation chamber 112 rapidly equalizes with the ambient pressure of the drilling fluid 204, with at least part of the activation chamber 112 filling with drilling fluid 204. As a result, axial deployment forces (represented by arrows 216) significantly exceed opposite axial resistive forces (represented by the sum of the remaining gas pressure forces 220 and the drilling fluid forces 224), thus causing hydraulically actuated axial displacement of the plunger 106 towards the compression chamber 115. This activation (also referred to herein as deployment), in which the length of the plunger rod 121 that projects from the housing 103 is increased, is thus actuated by hydraulic action of the drilling fluid 204.

In this example embodiment, an axial direction (i.e., aligned with the axis 124) extending from the activation chamber 112 towards the compression chamber 115 is thus the activation direction or the deployment direction of the plunger 106, with the opposite axial direction being referred to herein as the deactivation direction or the retraction direction.

Note that the sealed compression chamber 115 and the gas held captive therein serves as a cushioning mechanism that resists maximal axial displacement of the plunger 106 in the activation direction, thereby to limit the likelihood of dynamic metal-on-metal contact between the plunger head 118 and the end wall of the housing 103. It will be appreciated that, after failure of the activation rupture disc 136, the plunger 106 will automatically seek an equilibrium position in which gas pressure in the compression chamber 115 is more or less equal to the ambient fluid pressure. Although axial momentum of the plunger rod 121 during equalization may carry the plunger head 118 somewhat beyond the particular equilibrium position for the operative drilling fluid pressure, the compressible nature of the gas in the compression chamber (together with the fact that the compression chamber 115 is a sealed volume) causes the plunger head 118 to settle in the equilibrium position in a resiliently damped oscillatory movement. In other words, the sealed and gas-filled compression chamber provides an air cushion for stopping hydraulically actuated axial movement of the plunger 106 in an damped oscillatory fashion.

In some embodiments, the actuator 100 can have a cushioning mechanism that includes a damping system instead of or in addition to the air cushion provided by the compression chamber 115, as described above. A damping fluid (e.g., gas in the compression chamber 115 or a non-compressible fluid such as hydraulic oil in a pressure-connected damping volume), may in such instances be forced through a restricted orifice in response to actuated movement of the plunger 106 in the activation direction, thus damping axial movement of the plunger 106, shock absorber-fashion.

As mentioned above, the actuator 100 can form part of a downhole tool, an example embodiment of which (indicated by reference number 200) is partially shown in FIG. 2. Seismic tools of which the actuator 100 forms part may be configured such that activation of the actuator (e.g., by movement of the plunger 106 from its dormant position (FIG. 1) to its activated position (FIG. 2)) causes deployment of a tool coupling member, such as a mechanical arm, an anchor rod, a wedging lever, or the like. In the example embodiment of FIG. 2, the coupling member of the sensing tool 200 is provided by the plunger rod 121, which serves as a seismic anchor rod positioned on the sensing tool 200 for forced abutment against an underground structure when activated in order to mechanically couple the tool 202 in adjacent a downhole surface for seismic measurement purposes. The anchor rod in this example embodiment also serves to secure or anchor the sensing tool 200 in a particular downhole position. In this description, various anchoring mechanisms are described to provide a seismic coupling to the formation. In the described examples a common mechanism is used for securing or lodging seismic tools in position and for providing a mechanical coupling or link to the formation for seismic reception purposes. Note, however, that some embodiments may have a separate mechanisms for these purposes. Returning now to the example embodiment of FIGS. 1 and 2, it will be seen that the actuator 100 does not have a deactivation mechanism for selectively deactivating hydraulic urging of the plunger 106 in the activation direction, and also does not have a return mechanism for causing (while the actuator 100 remains at the downhole position in which it was deployed) remotely controlled displacement of the plunger 106 from its activated position back into the dormant position. Instead, the compression chamber 115 remains permanently filled with its original volume of nitrogen gas, while the activation chamber 112 remains exposed to the ambient drilling fluid 204 via the rupture 208 in the activation port 133.

In some methods of using the actuator 100, the sensing tool 200 may be returned to the surface subsequent to activation of the actuator 100 and associated deployment of the sensing tool 200. In such cases, ambient fluid pressure will progressively decrease as the sensing tool 200 is raised towards the surface, with fluid pressure at the surface approaching atmospheric pressure. It will be appreciated that exposure of the actuator 100, while in its activated condition (i.e., in which the activation rupture disc 136 has failed), to ambient fluid pressures which are more or less at atmospheric levels will cause the plunger 106 to seek a hydrostatic equilibrium position which corresponds more or less to its initial dormant position (FIG. 1). This is because ambient fluid pressure approximately equal to initial gas pressure in the compression chamber 115 should result in automatic movement of the plunger 106 to a position which there is substantially no pressure difference across the plunger head 118. In the above-described embodiment, gas in the compression chamber 115 is initially at atmospheric levels. During the raising of the actuator 100 back towards the surface, the plunger 106 will thus progressively be retracted from its deployed position, reaching a more or less fully retracted position at the surface. In other embodiments, the compression chamber 115 may be pressurized to be somewhat higher than atmospheric pressure, to cause more vigorous automatic retraction of the plunger 106 during recovery of the sensing tool 200.

Figure 3:
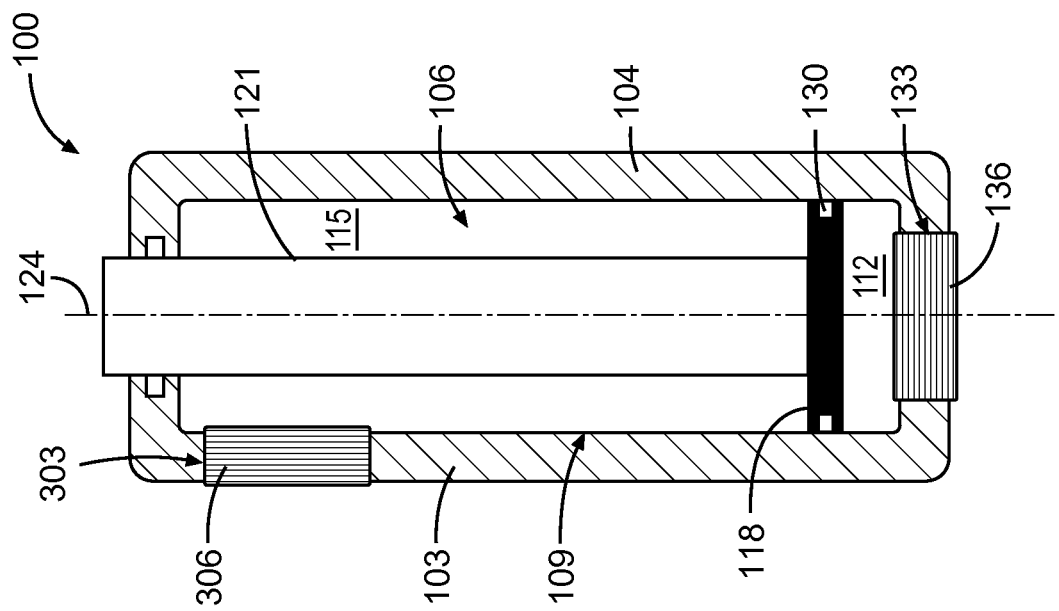
FIG. 3 depicts a schematic axial section of an actuator for a seismic sensor, in accordance with another example embodiment, the actuator being shown in an initial dormant condition.

FIGS. 3 and 4 show an actuator 100 for incorporation in a seismic tool in accordance with another example embodiment. The actuator 100 is configured for functioning in a manner largely similar to that described above with reference to the actuator 100 of FIGS. 1 and 2. The actuator 100, however, further comprises a pressure-controlled deactivation mechanism to allow operator-controlled remote deactivation of the actuator 100 while it is located downhole subsequent to activation. As will be described below, such deactivation of the actuator 100 may be triggered by causing predefined wellbore pressure conditions at the downhole location of the sensing tool 200.

The actuator 100 is broadly similar in construction to the actuator 100 of FIG. 1, but the housing 103 of the actuator 100 defines, in addition to the activation port 133, an opening in the cylinder wall 104 that provides a deactivation port 303 which defines a deactivation passage or deactivation conduit leading from the exterior of the housing 103 into the compression chamber 115. The deactivation port 303 is in this example embodiment identical in construction to the activation port 133, so that rupture discs such as those described before are interchangeably mountable on the activation port 133 and the deactivation port 303.

The deactivation port 303 is in this example embodiment located at or adjacent an end of the housing 103 furthest from the activation chamber 112, being shaped and positioned such that it leads into only the compression chamber 115 (and not into the activation chamber 112), regardless of the axial position of the plunger head 118 between its opposite extremes. The deactivation port 303, when it is not closed off by a closure device, thus defines a fluid connection between the compression chamber 115 and ambient drilling fluid 204 exterior to the housing 103.

The actuator 100 of FIG. 3 further includes a non-reclosable, frangible closure device in the example form of a burst disc or rupture disc 306 mounted in the deactivation port 303, sealingly closing the deactivation port 303 against fluid flow therethrough. For clarity of description, the burst disc 306 in the deactivation port 303 is further referred to as the deactivation disc 306, while the rupture disc 136 in the activation port 133 is referred to as the activation disc 136.

The deactivation disc 306 is in this example embodiment a rupture disc similar to the activation disc 136, but has a different pressure rating. The pressure rating of a rupture disc is in this embodiment substantially equal to a maximum indicated pressure differential across it which the rupture disc can bear without failing. In the example embodiment of FIGS. 3 and 4, the deactivation disc 306 has a higher pressure rating than the activation disc 136. As will be explained below, the actuator 100 of FIG. 3 is thus configured for automated pressure-triggered activation by failure of the activation disc 136 at a lower drilling fluid pressure threshold, and is configured for subsequent automated pressure-activated deactivation upon rupture of the deactivation disc 306 at a higher drilling fluid pressure threshold.

In operation, hydraulically actuated, pressure-controlled deployment of the actuator 100, when located at a target downhole position, is achieved by performing the operations described above with reference to the actuator 100 of FIGS. 1 and 2. At a lower one of the drilling fluid pressure thresholds (also referred to herein as the activation pressure), the activation disc 136 automatically ruptures, exposing the activation chamber 112 to the ambient drilling fluid 204 and thereby causing hydraulically actuated axial displacement of the plunger 106 into its deployed position.

The operator thereafter has the option of deactivating the actuator 100 by controlling increase of ambient drilling fluid pressure. When the ambient drilling fluid pressure is ramped up above the higher one of the drilling fluid pressure thresholds (also referred to herein as the deactivation pressure), the deactivation disc 306 fails, so that a rupture 404 (FIG. 4) is formed in the deactivation disc 306. The compression chamber 115 is thus exposed to ambient drilling fluid pressure via the rupture 404 extending through the deactivation port 303. Failure of the deactivation disc 306 causes deactivation of the actuator 100, in that the pressure differential across the plunger head 118 is significantly reduced, neutralizing hydraulic urging of the plunger 106 in the activation direction.

Note that deactivation of the actuator 100 in this manner can cause at least partial retraction of the plunger 106 due to hydraulic action whereby the plunger 106 finds an equilibrium position in which fluid pressures in the activation chamber 112 and the compression chamber 115 are equalized, both being substantially equal to ambient fluid pressure values. The equilibrium position of the free-floating plunger 106 will automatically move away from the compression chamber 115, in a deactivation direction opposite to the activation direction, in response to subsequent decreases in ambient drilling fluid pressures. Pressure decreases to cause retraction of the plunger 106 (i.e., movement thereof in the deactivation direction) may be effected by operator-control of wellbore pressure, and/or may in some instances result at least in part from uphole movement of the actuator 100.

In some embodiments, the actuator 100 may include a return mechanism configured to automatically cause substantially reliable return of the plunger 106 to its dormant position subsequent to deactivation of the actuator 100. One example embodiment of an apparatus that includes such a return mechanism is shown in FIG. 5, indicated as actuator 100.

In the example embodiment of FIG. 5, the return mechanism includes a bias mechanism configured for exerting a mechanical bias on the plunger 106, urging the plunger 106 towards the retracted position (e.g., urging the plunger 106 axially towards that end of the housing 103 in which the activation disc 136 is located). In this example, the bias mechanism comprises a helical compression spring which is co-axially located on the plunger rod 121 and is held captive in the compression chamber 115. The compression spring 505 is positioned to urge the plunger head 118 so as to expand the compression chamber 115. Because the axial distance between the plunger head 118 and the compression end of the housing 103 varies in response to axial displacement of the plunger 106, axial movement of the plunger head 118 closer to the compression end of the housing 103 causes shortening of the compression spring 505, resulting in an increase in the magnitude of a resistive bias force urging the plunger head 118 away from the compression end of the housing 103.

Operation of the actuator 100, in use, is schematically illustrated in FIGS. 5A-5C, which showed sequential conditions of the actuator 100 during a activation-deactivation cycle. Initially (FIG. 5A), the actuator 100 is in a condition analogous to that previously described with reference to FIGS. 1 and 3. Note, however, that the compression spring 505 may in some instances be selected such that it exhibits a bias force on the plunger head 118 even in the initial retracted condition, in which case initial gas pressure in the activation chamber 112 is somewhat greater than the initial gas pressure in the compression chamber 115. This is because net forces acting to retract the plunger rod 121 axially into the housing 103 comprises not only fluid pressures acting on the plunger head 118 and the exposed end of the plunger rod 121 but also includes the bias force exerted by the compression spring 505.

After locating the actuator 100 at a target position downhole and subsequently ramping up the drilling fluid pressure above the lower threshold value (or, instead, upon lowering the actuator 100 to a target depth corresponding to the lower threshold pressure) the activation disc 136 ruptures, causing pressure equalization between the activation chamber 112 and the ambient drilling fluid 204. The increased fluid pressure in the activation chamber 112 causes deployment by hydraulically actuated displacement of the plunger 106 for increased extension of the plunger rod 121 from the housing 103 (FIG. 5B). Such automatically actuated displacement of the plunger 106 is performed against a biasing force of the compression spring 505, which progressively increases in magnitude with an increase in the distance by which the plunger rod 121 projects from the housing 103.

When the deployed actuator 100 is to be retrieved or retracted, the operator can remotely trigger deactivation of the actuator 100 and automated retraction of the plunger rod 121 by increasing drilling fluid pressure to exceed the corresponding deactivation pressure at the downhole location of the actuator 100. As before, such above-threshold ambient fluid pressure conditions result in failure of the deactivation disc 306, exposing the compression chamber 115 to ambient fluid pressure conditions. Because the activation chamber 112 and the compression chamber 115 are now in fluid communication via the ambient drilling fluid 204, fluid pressures in the respective chambers equalize, so that there is substantially no net hydraulic force exerted on the plunger 106. The actuator 100 is thus deactivated.

The compression spring 505, however, continues to bias the plunger 106 to exert an axially retractive bias on the plunger 106, but the biasing force is no longer opposed by the hydraulic/pneumatic forces caused by a pressure differential across the activation chamber 112 and the compression chamber 115. The compression spring 505 therefore causes automatic retraction of the plunger 106 subsequent to failure of the deactivation disc 306, as shown schematically in FIG. 5C. Once pressure in the activation chamber 112 and the compression chamber 115 has equalized, acting on the plunger head 118 forces are limited substantially to the force of the spring and friction resistive to axial movement of the plunger 106 relative to the housing 103. The plunger 106 will therefore retract until the acting spring force is in equilibrium with the mechanical friction, or until the spring 505 is fully extended.

As mentioned previously, the activation disc 136 and/or the deactivation disc 306 may in some embodiments be configured for removable and replaceable mounting on the housing 103. A drilling tool system of which the actuator 100 forms part may further include a plurality of rupture discs having a variety of respective pressure ratings. Such a set of rupture discs may be of modular construction, in that each rupture disc may be mountable on either one of the ports 133, 303. Any of the rupture discs may thus be selected by an operator to serve either as the activation disc 136 or as the deactivation disc 306. A method of deploying a downhole tool can in such instances include selecting a particular activation rupture disc 136 and/or a particular deactivation disc 306 from a plurality of interchangeably mountable rupture discs having different threshold pressure values (which may be expressed as respective pressure differentials) at which the respective rupture disc is designed to fail. The provision of a plurality of such modularly interchangeable removable and replaceable rupture discs allows an operator to configure a particular actuator 100 on-site for deployment at an operator-selected trigger pressure or target depth, and/or to configure the actuator 100 for pressure-activated retraction at an operator-selected deactivation pressure.

A further benefit of removable and replaceable connection of the rupture discs 136, 306 to the housing 103 is that the actuator 100 is thus repeatedly reusable subject to replacement of failed rupture discs between successive deployments. The actuator 100 of FIG. 5 may, for example, be retrieved after deployment and subsequent retraction of the plunger rod 121 in a particular drilling installation. The retrieved actuator 100, having a ruptured activation disc 136 and a ruptured deactivation disc 306, may be refitted for subsequent use by removing the ruptured discs 136, 306, and replacing them with new rupture discs. In instances where the deployment parameters and retraction parameters of the actuator 100 for the subsequent application is identical to those of the immediately preceding application, the ruptured discs 136, 306 can be selected to have pressure ratings identical to those of the ruptured discs which are being replaced. If, however, there is to be a variation in the deployment parameters and/or the retraction parameters, the activation disc 136 and/or the deactivation disc 306 can correspondingly be selected to have a respective pressure rating different from that of the preceding application, as the case may be.

Limitation mechanisms may be provided for limiting axial displacement of the plunger 106 to a particular axial range. A mechanical stop may, for example, be provided for limiting plunger movement during deployment. An example of such a mechanical stop can be seen in a double acting actuator 100 forming part of a tool 600 illustrated in FIG. 6 (which will be described in greater detail below). The mechanical stop in FIG. 6 comprises an annular shoulder 660 that protects radially into the cylinder volume 109 for abutment of the plunger head 118 against it. The position of the shoulder 660 defines the length of the deployment stroke, preventing movement of the plunger head 118 beyond it. Such a limiting mechanism may be provided to ensure that the pressure differential across the deactivation disc 306 (e.g., the pressure difference between the compression chamber 115 and the ambient drilling fluid 204) is sufficiently large to cause rupture of the deactivation disc 306.

Note that operation of the shoulder 660 causes the plunger head 118 to stop short of the axial position it would otherwise have assumed for drilling fluid pressures greater than that at which the plunger rod 121 reaches the shoulder 660. As a result, the sealed volume defined by the compression chamber 115 has a greater capacity and concomitantly a lower pressure than would otherwise have been the case at such drilling fluid pressure levels. Thus limiting the gas pressure level in the compression chamber 115 translates to a relative increase in the pressure differential across the deactivation disc 306 for a given pressure beyond the deployment stroke limit, when compared to an otherwise identical device without the shoulder 660.

As can be seen from the above description, the actuator 100 of FIG. 5 provides a double acting downhole actuating apparatus, providing for a hydraulically actuated deployment stroke, and a reciprocal hydraulically actuated retraction stroke. This is in contrast to the actuator 100 described with reference to FIG. 1, which serves as a single-acting downhole actuator.

Note that the physical properties of the compression spring 505 are selected such that the magnitude of the bias is, on the one hand, weak enough to allow more or less full deployment of the plunger rod 121, while, on the other hand, being strong enough to ensure reliable and full retraction of the plunger 106 under the urging of the compression spring 505, overcoming residual forces resistive to the axial retraction—such as friction forces on the seals 127, 130 and damping effects that may be caused by forced expulsion of drilling fluid 204 from the activation chamber 112. It will be appreciated that the magnitudes of the above-discussed forces relevant to selection of the physical properties of the compression spring 505 may, for identical actuators 100, differ in magnitude at different ambient drilling fluid pressures. The method may thus include fitting different actuators 100 that are intended for deployment at different trigger pressures with differently rated compression springs 505.

Some variations to the above-described example actuators will now be briefly discussed with reference to example actuators forming part of the respective example downhole tools illustrated in FIGS. 6-7 and 11-16. The working of each of the example tools will, later herein, be described separately.

Some embodiments may provide for an actuator 100 in which the deployment stroke comprises retraction of the plunger rod 121 into the housing 103. Such arrangements may be used in applications where the plunger 106 is configured for exerting a pulling force on a deployment mechanism of a downhole tool of which of the actuator 100 forms part, to cause actuated deployment of a coupling member of the tool. Example embodiments of such pull-action actuators 100 are illustrated in FIGS. 5D and 5E, and are shown to be incorporated in downhole tools in accordance with the example embodiments of FIGS. 11 and 14-16.

Figure 11A:
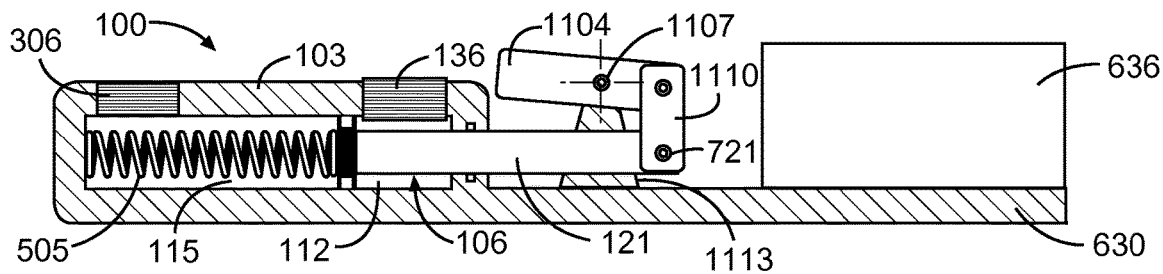
FIGS. 11A-11C depict a series of schematic axial sections of a seismic sensor having a hydraulically actuated anchoring mechanism in accordance with another example embodiment, depicting the anchoring mechanism in a dormant condition, an activated condition, and a deactivated condition, respectively.
Figure 11B:
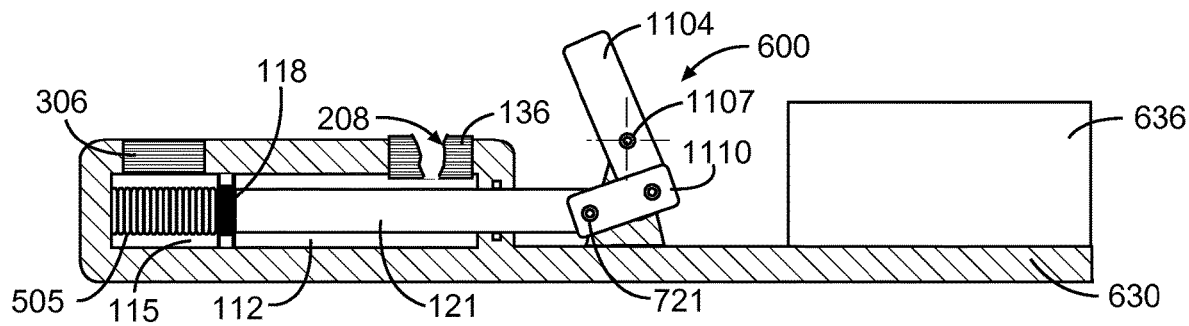
Figure 11C:
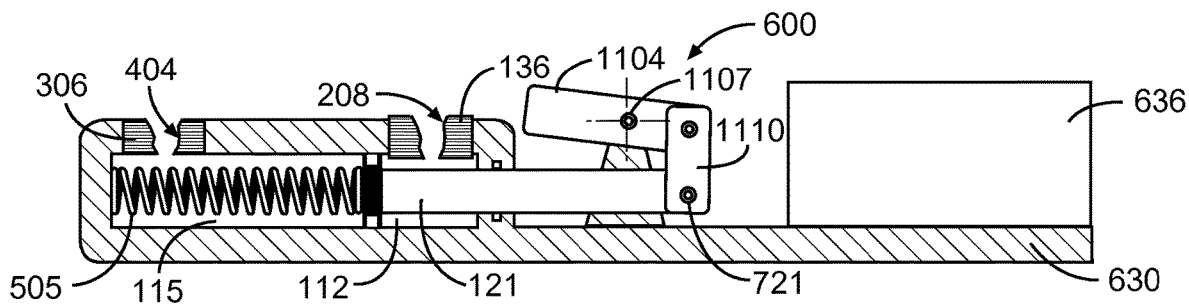

As can be seen, for example, in FIGS. 11A-11C, the pull-action actuator 100 is analogous in construction and function to the push-action actuators 100 previously described, with a major distinction being that, in the dormant or deactivated position, the plunger rod 121 is maximally extended from the housing (FIG. 11A). Pressure-activated failure of the activation disc 136 (which in the actuator 100 of FIG. 11 is located in a sidewall of the housing 103, adjacent one end thereof) again causes expansion of the activation chamber 112, thereby hydraulically driving the plunger head 118 axially along the cylinder volume 109 in the activation direction (FIG. 11B) such that the compression chamber 115 is reduced in volume. This deployment stroke, however, causes retraction of the plunger rod 121 further into the housing 103 (as opposed to causing increased protection from the housing 103, as is the case for the push-action actuator 100 of FIGS. 5A-5C), thereby exerting a pulling force on a tool deployment mechanism, as will be described below.

Figure 5D:
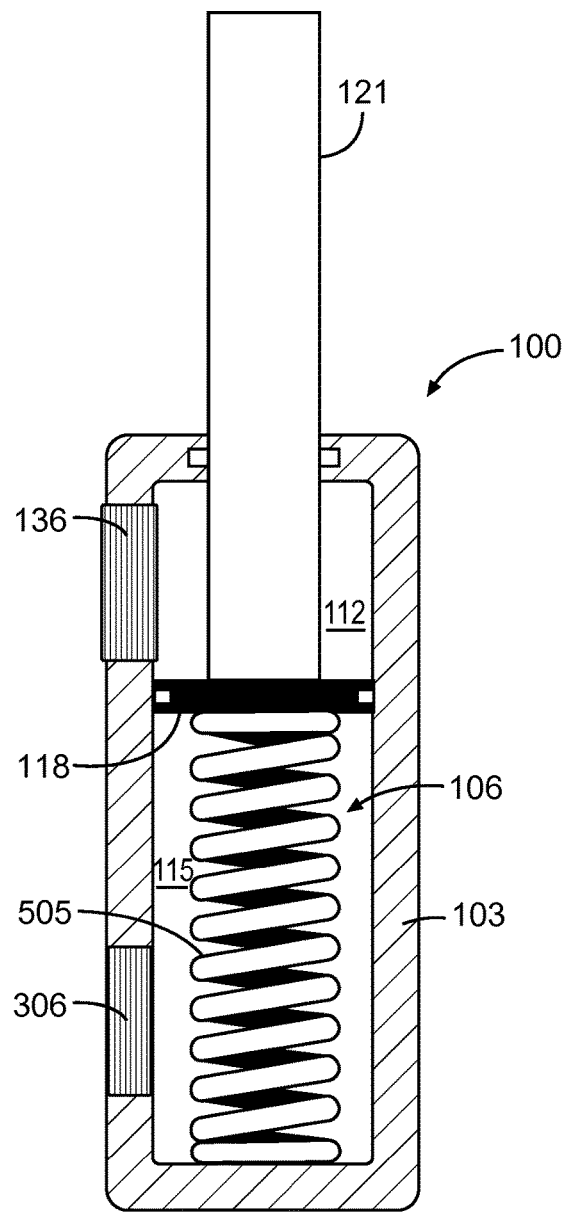
FIGS. 5D and 5E depict schematic axial sections of respective actuators for seismic sensors in accordance with respective further example embodiments.
Figure 5E:
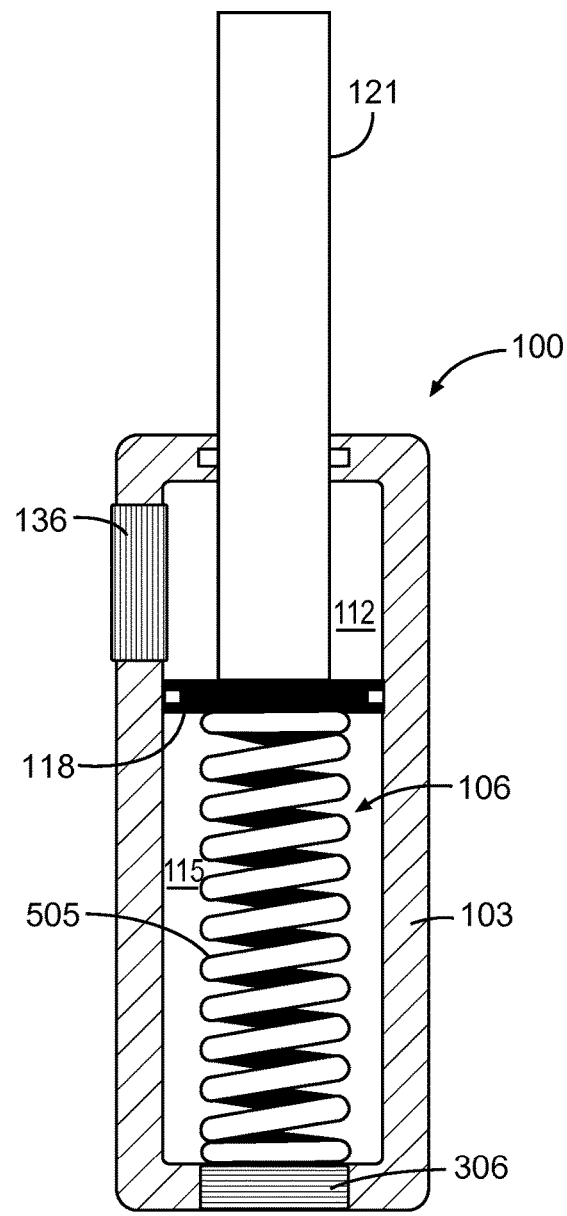
Figure 15A:
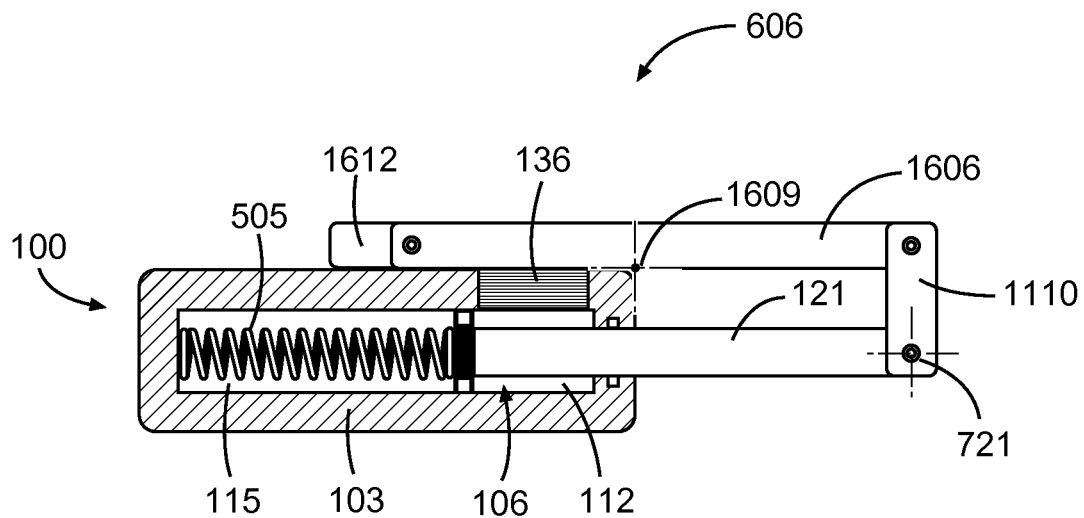
FIGS. 15A-15B depict a series of schematic axial sections of an anchoring mechanism for a seismic tool in accordance with another example embodiment, the anchoring mechanism being shown in a dormant condition and in an activated condition, respectively.

Note that, in the actuator 100 of FIGS. 5A-5C, the compression spring 505 is co-axially located around the plunger rod 121. In the pull-action actuator 100 of FIGS. 5D, 5E, 11 and 14-16, however, the compression spring 505 and the plunger rod 121 are co-axially aligned, but are located to opposite sides of the plunger head 118. As a result, the bias of the spring 505 caused by resilient compression thereof again urges the plunger 106 towards the dormant or deactivated position (FIG. 15A). Described differently, a major configurational difference between the actuators 100 of FIGS. 5 and 11 is that the plunger rod 121 of FIG. 11 is located in the activation chamber 112, extending co-axially therethrough, while the plunger rod 121 of FIGS. 5D and 5E is housed in the compression chamber 115.

A benefit of employing the example actuators 100 for coupling a sensing tool to a formation (or other downhole structure, such as the casing) is that its mechanism of deployment and retraction is robust and reliable, even in harsh downhole environments. Because the activation and deployment mechanisms of the actuator 100 is wireless and is exclusively mechanical/hydraulic, not being dependent on any electronic control circuitry or electrical power, the actuator 100 is largely resistant to high temperatures. This allows for reliable use of the actuator 100 in-temperature environments where electronics have a high risk of failure. The actuator 100 is particularly compatible with high temperature optical fiber applications and instrumented wells were activation is required only once.

The example actuator 100 is furthermore of simple construction, allowing for cost effective manufacture with high reliability. Cost-effectiveness of the actuator 100 is enhanced in embodiments where the rupture discs are removably and replaceably connectable to the housing 103, allowing for multiple repeat uses of the actuator 100.

Figure 6:
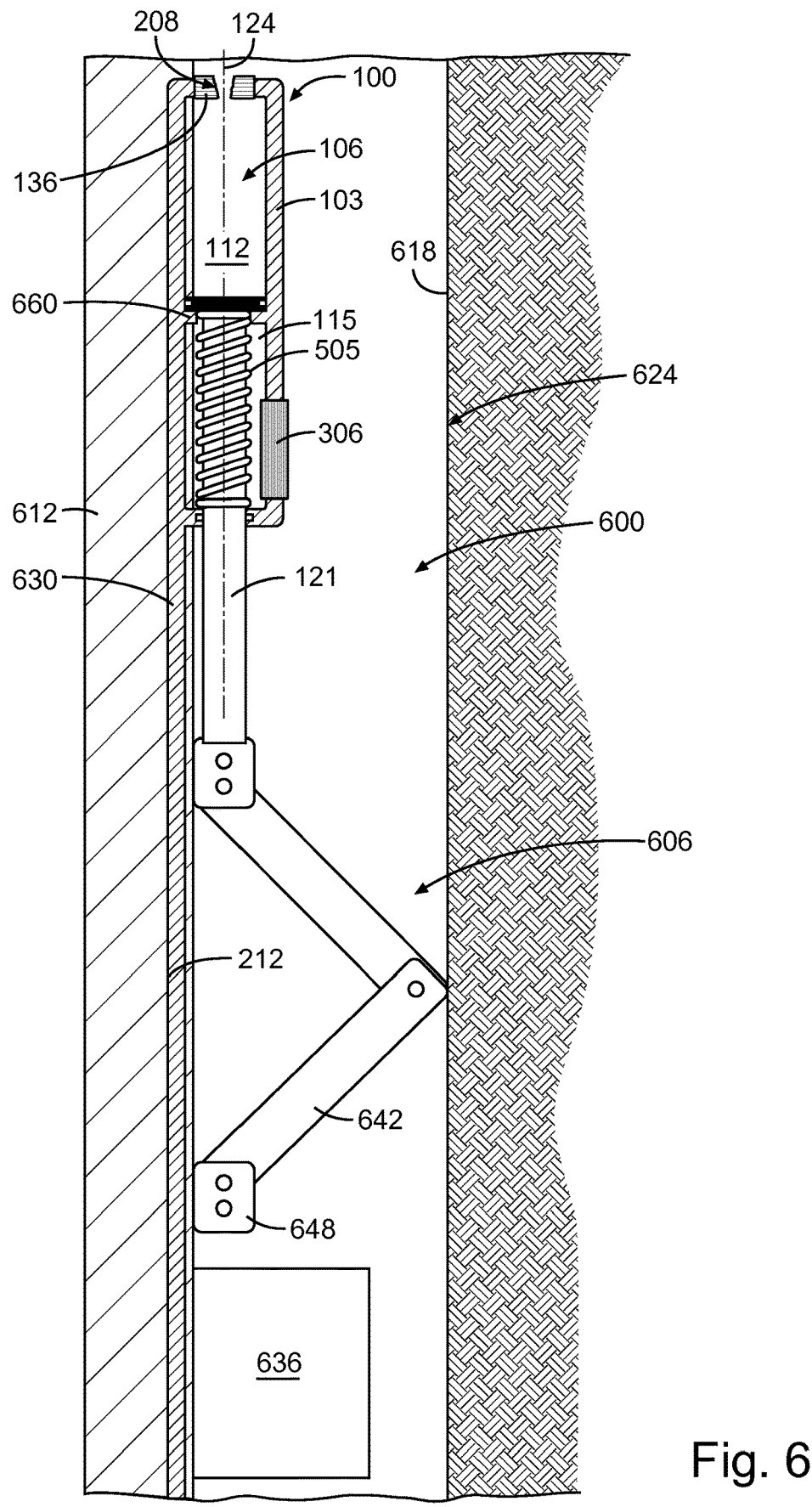
FIG. 6 depicts a schematic axial section of a part of a drilling installation that includes a seismic sensor having an actuator in accordance with another example embodiment, the tool being shown in an activated condition in which the tool is anchored in position by operation of the actuator.

FIG. 6 shows an example embodiment of a downhole tool that incorporates an actuator 100 similar or analogous to that described above. The tool in this example comprises a sensor tool 600 for sensing seismic activity, with the frame 630 being connected to an anchoring mechanism 606 that is deployable by the actuator 100 to lock the tool 600 in a target position.

In FIG. 6, the sensor tool 600 is shown in a condition in which it is locked in position within an annular cavity between a wellbore casing 612 and a cylindrical wall 618 of a borehole 624. The sensor tool 600 is shown in a locked condition in which the anchoring mechanism 606 anchors it longitudinally in a target position by forced lateral expansion or dilation that causes forceful engagement with both the borehole wall 618 and the cavity wall provided by the casing the casing 612, so that the tool 600 is braced in position. Note that the particular configuration of deployment illustrated in FIG. 6 is only one example of deployment of the tool 600, and that the tool 600 can in other instances be deployed in different configurations and in different subterranean cavities defined within the borehole or otherwise forming part of the wellbore. The tool 600 may, for example, alternatively be deployed on tubing located within a central circular cylindrical passage of the wellbore, which is defined along a portion of its length by the hollow interior of the casing 612 such that the linkage 642 of the anchoring mechanism 606 bears against the casing 612 (e.g., contacting the radially inner surface of the casing 612), the casing 612 being cemented in place to form a good mechanical coupling to the formation.

The sensor tool 600 comprises a rigid frame 630 in the example form of a base plate on which a sensor pad 636 and the housing 103 of the actuator 100 are fixedly mounted. When the sensor tool 600 is locked in position (as shown in FIG. 6), the frame 630 bears tightly against an outer diameter of the casing 612, so that seismic tremors or vibrations experienced by the formation is transferred to the sensor pad 636 via the frame 630.

As mentioned, a mechanical coupling or link may be provided between the casing 612 and the formation 118 (e.g., by filling with settable cementitious material, such as concrete, the annular cavity between the outer diameter of the casing 612 and the co-axial borehole wall 618, and allowing the material to set). Seismic activity in the formation is thus transferred to the casing 612 via an encapsulating concrete jacket. The anchoring mechanism 606, in turn, serves to link the tool 600 to the casing 612 by physical contact, and to provide a mechanical or seismic coupling between the frame 630 and the casing 612, allowing the transfer of seismic waves or vibration experienced by the casing 612 to the frame 630. The sensor pad 636 is, in its turn, mounted to the frame 630 for substantially lossless (or low-loss) transmission of seismic signals from the frame to the sensor pad 636 in this example embodiment, the frame 630 may be a steel structure of one-piece construction, for example being formed from steel plate. The sensor pad 636 is rigidly mounted on the frame 630, for example being welded or bolted to the frame to promote effective transmission of seismic signals from the frame to the sensor pad 636. Activation of the anchoring mechanism 606 therefore effectively couples or link the sensor pad 636 mechanically to the formation 118, with seismic tremors or other seismic activity transmitted via the formation 118 being transmitted to the casing via the intermediate cement jacket, from the casing to the anchoring mechanism, from the anchoring mechanism to the frame 630, and from the frame to the sensor pad 636.

The anchoring mechanism 606 in this example embodiment comprises a mechanical linkage 642 which is, at one end thereof, pivotally connected to the plunger rod 121 of the actuator 100. The other end of the linkage 642 is connected to the frame at an anchor point provided by an anchor 648 such as to allow only pivoting about the anchor 648 as the single degree of movement relative to the frame 630, preventing relative translation between the linkage component connected thereto and the frame 630.

Figure 7A:
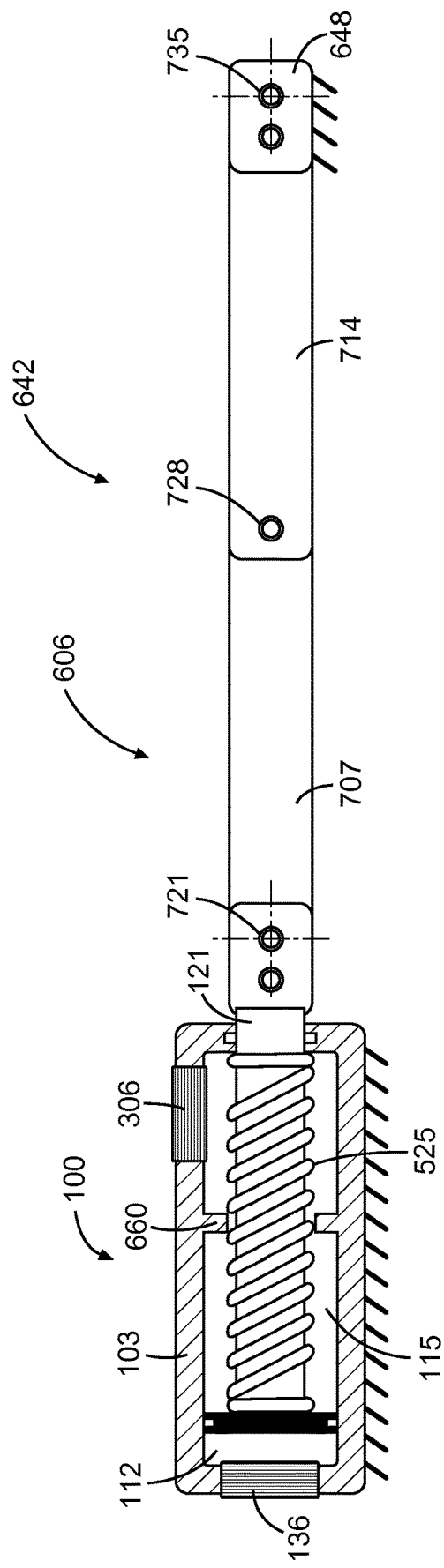

Operation of the anchoring mechanism 606 will now be described in greater detail with reference to FIGS. 7A-7C, which schematically show the anchoring mechanism 606, including the actuator 100, in a sequence of operative conditions. Referring now to FIGS. 7A-7C, the anchoring mechanism 606 is shown sequentially in an initial dormant condition (FIG. 7A) in which it is originally inserted into the borehole 624 and moved to a target position, an activated or expanded condition (FIG. 7B) in which the anchoring mechanism 606 is activated and secures the sensor tool 600 in position, and a deactivated or retracted condition (FIG. 7C) in which the anchoring mechanism 606 is deactivated to allow movement of the sensor tool 600 from the target position and in which the tool 600 is physically or seismically decoupled from the formation.

The linkage 642 of the anchoring mechanism 606 is in this example embodiment has two link members consisting of rigid elongated metal bars providing a proximal link 707 closest to the actuator 100, and a distal link 714 furthest from the actuator 100. The actuator 100 is oriented in this example embodiment such that its longitudinal axis 124 is parallel to a longitudinal axis of the borehole, but is laterally offset relative thereto, due to location of the tool 600 in the annular cavity between the casing 612 and the borehole wall 618. Is A proximal end of the proximal link 707 (i.e., the end of the proximal link 707 closest to the actuator 100) is connected end-to-end to the end of the plunger rod 121 that projects from the housing 103, to provide an actuated joint 721 that allows pivotal movement of the proximal link 707 about the actuated joint 721. The distal end of the proximal link 707 is, in turn, connected end-to-end to the proximal end of the distal link 714, defining an expansion joint 728 about which both of the links 707, 714 are pivotable.

Similarly, the distal link 714 is pivotally connected to the proximal link 707 at the expansion joint 728 and is pivotally connected to the anchor 648 at its distal end, defining a fixed anchored joint 735 about which the distal link 714 is pivotally displaceable. It will thus be seen that the anchoring mechanism 606 is of jackknife construction, with the actuated joint 721 having a fixed radial position relative to the borehole 624 (i.e., an a radial direction indicated by arrows 748 in FIG. 7B), with an axial position of the actuated joint 721 being variable responsive to axial displacement of the plunger 106 in the activation direction (i.e., as indicated by arrows 742 in FIG. 7B). The expansion joint 728, however, is displaceable both radially and axially in response to actuated axial movement of the plunger 106, therefore causing lateral expansion or dilation of the tool 600 and resulting in forced contact engagement of the expansion joint 728 of the anchoring mechanism 606 against an adjacent cavity wall (e.g., the borehole wall 618 or an inner diameter of the casing 612, as the case may be). The frame 630 is thereby against the outer diameter of the casing 612 tool 600 both with the borehole wall 618 and with an outer diameter of the casing 612.

The tool 600 is initially lowered into the annular cavity between the outer diameter of the casing 612 and the inner diameter of the borehole wall 618 while the tool 600 is in its initial dormant condition (FIG. 7A). When the tool is located at a target position along the length of the borehole 624, deployment of the anchoring mechanism 606 can be triggered by the provision of above-threshold pressure conditions in the ambient drilling fluid 204. As mentioned previously, such activation of the actuator 100 may be achieved by operator-controlled ramping up of pressure levels in the drilling fluid 204, or may in other embodiments be achieved by axial displacement of the tool 600 along the borehole 624 until it reaches a target position in which the pressure of the ambient drilling fluid 204 corresponds to or exceeds a trigger pressure of the activation disc 136.

When the ambient drilling fluid exceeds ambient drilling fluid conditions corresponding to the trigger pressure of the activation disc 136, the activation disc 136 ruptures, automatically resulting in hydraulically actuated axial displacement of the plunger rod 121 in the activation direction 742 (FIG. 7B). Actuated axial displacement of the actuated joint 721 away from the housing 103 results in jackknife radial displacement of the expansion joint 728, as shown in FIG. 7B. The anchoring mechanism 606 is designed such that the deployment stroke of the plunger 106 results in radial displacement (in this example being approximately perpendicular to the activation direction 742 of the expansion joint 728 that is at least equal to the radial depth of the annular cavity between the outer diameter of the casing 612 and the inner diameter of the borehole wall 618. Deployment of the anchoring mechanism 606 due to axial extension of the plunger rod 121 therefore results in contact of the expansion joint 728 against the borehole wall 618, forcing the frame 630 radially inwardly into contact with a cylindrical outer surface of the casing 612 (see, for example, FIGS. 6 and 7B).

The continuously urged physical contact between the anchoring mechanism and the relevant cavity wall physically couples the tool 600 to the borehole wall 618 and/or the casing 612 so as to establish a mechanical or vibratory pathway between the borehole wall 618 and the tool 600. Such a physical contact coupling to the borehole wall 618 promotes accurate and sensitive exposure of the sensor tool 600 to seismic activity in the relevant Earth formation. Note that the mechanical or vibratory pathway between the point of contact (in this example the expansion joint 728) of the anchoring mechanism and the actuator housing 103 comprises an uninterrupted series of rigid components, in this example being metal components. The anchoring mechanism 606 is, in this example embodiment, configured to transmit seismic waves experienced at the borehole wall 618 to the frame 630 not only via the actuator housing 103, but also via the anchor 648.

Note further that hydraulic actuation of the anchoring mechanism 606, to provide a persistent physical coupling, is not limited to the initial deployment of the anchoring mechanism into contact with the borehole wall 618, but comprises continuous application of force by the actuator on the anchoring mechanism 606, to continuously press the anchoring mechanism 606 into contact with the borehole wall 618. The construction of the actuator 100, as described previously, allows utilization of the pressurized wellbore fluid for hydraulically forcing the anchoring mechanism 606 continuously into contact with the borehole wall 618.

In this deployed condition, the expansion joint 728 of the anchoring mechanism 606 is continuously forced radially outwardly against the borehole wall 618, causing corresponding radially inward bearing of the frame 630 against the outer cylindrical sidewall. While surface of the casing 612. Axial displacement of the tool 600 along the annular cavity between the casing 612 and the borehole wall while the anchoring mechanism 606 is in the activated condition, is resisted by axially acting friction caused by the a radial contact or bracing force exerted via the anchoring mechanism 606 and acting perpendicularly to the outer surface of the casing 612 and the co-axial cylindrical borehole wall 618. In this manner, the anchoring mechanism 606 serves to secure or anchor the tool 600 in position while it is in the activated condition. It will be appreciated that the radial lodging forces (which result in frictional resistance to axial displacement of the tool 600) is caused by hydraulic actuation of the plunger 106 through hydraulic action of the ambient drilling fluid 204 with which the cavity between the casing 612 and the borehole wall 618 is filled.

In some example embodiments, a method of installing the sensor tool 600 in a target position along the borehole 624 may comprise inserting the tool 600 into the annular cavity between the casing 612 and the borehole wall 618, and moving the tool 600 axially along the annular cavity until it reaches a desired target position. After deployment of the anchoring mechanism 606 at the target position (e.g. by ramping up drilling fluid pressure levels above the predefined trigger pressure, or in response to the drilling fluid 204 reaching pressure levels corresponding more or less to the target depth) the annular cavity at and adjacent to the target position at which the tool 600 is located may then be filled with a settable fluid material, in this example embodiment being filled with concrete. Once the concrete has set, the tool 600 is permanently held captive in the target position by the ambient concrete.

In other embodiments, however, the sensor tool 600 may be located only temporarily at a particular target position, and may selectively be released after axial anchoring thereof into position by the anchoring mechanism, to allow retrieval or further axial displacement under operator control. Release or retraction of the anchoring mechanism 606 can selectively be effected by an operator by controlled increase of ambient drilling fluid conditions to a level greater than the deactivation pressure of the deactivation disc 306. Exposure of the actuator 100 to such above-threshold drilling fluid conditions automatically results, in this example embodiment in rupture of the deactivation disc 306, in this example embodiment, causing automatic retraction of the plunger rod 121 into the housing 103 under the urging of the spring 505, resulting in displacement of the expansion joint 728 radially inwardly (see, for example FIG. 7C). The mechanical linkage 642 is thus reduced in radial extent, so that the expansion joint 728 no longer bears against the borehole wall 618. The actuator 100 is thus unlocked, being disposed into a retracted or deactivated condition (see, for example, FIG. 7C), which allows axial movement of the actuator 100 along the annular cavity between the casing 612 and the borehole wall 618.

Figure 8:
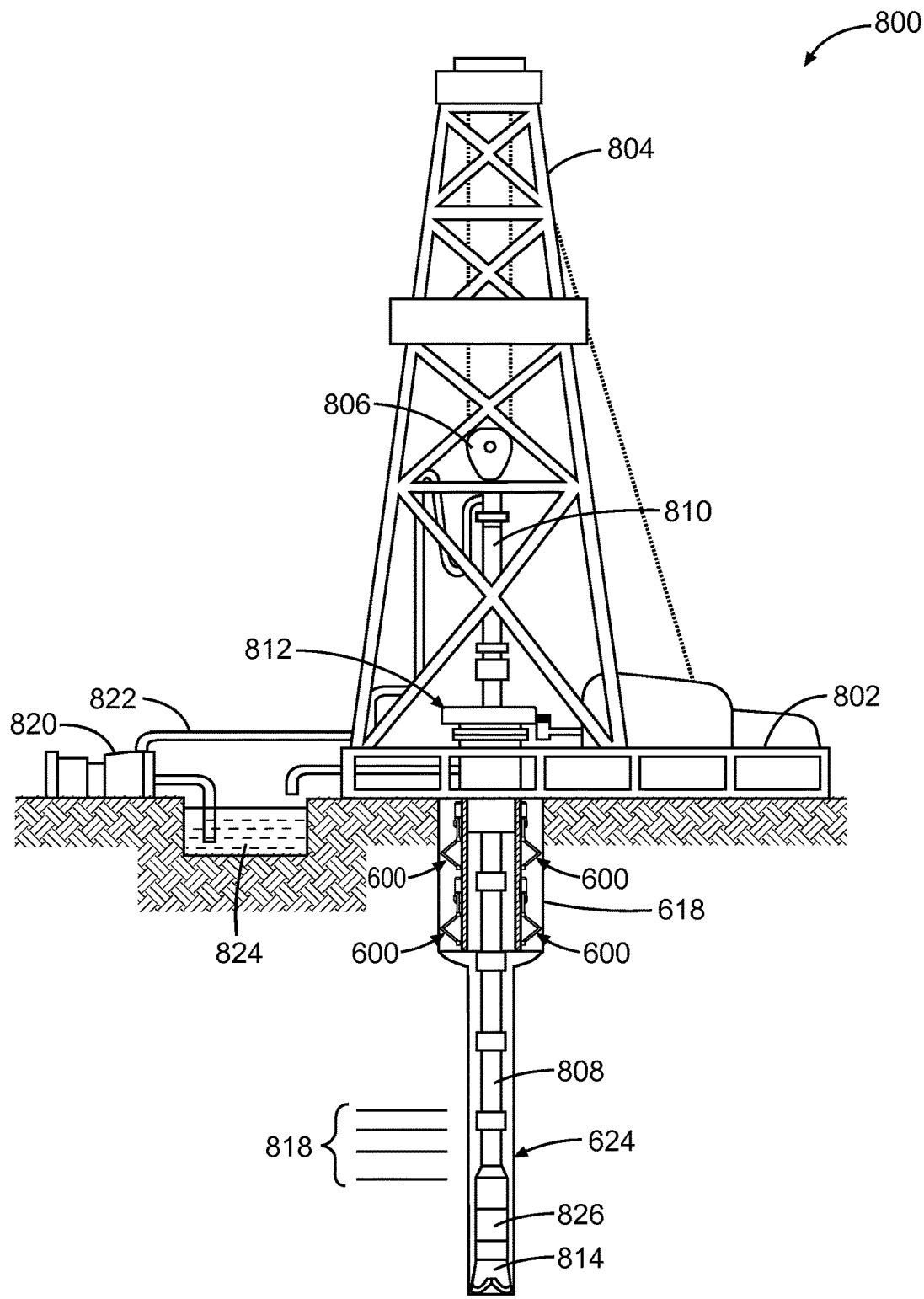
FIG. 8 depicts a schematic elevational overview of a drilling installation including a plurality of seismic sensors such as that of FIG. 6, and accordance with an example embodiment.

An example embodiment of a drilling installation in which one or more of the sensor tools 600 is in this example embodiment applied is illustrated schematically in FIG. 8, which shows a schematic illustration of an example wellbore 800. A drilling platform 802 is equipped with a derrick 804 that supports a hoist 806 for raising and lowering a drill string 808. The hoist 806 suspends a top drive 810 suitable for rotating the drill string 808 and lowering the drill string 808 through the well head 812. Connected to the lower end of the drill string 808 is a drill bit 814. As the drill bit 814 rotates, it creates a borehole 624 that passes through various formations 818. A pump 820 circulates drilling fluid 204 through a supply pipe 822 to top drive 810, down through the interior of drill string 808, through orifices in drill bit 814, back to the surface via an annulus around drill string 808, and into a retention pit 824. The drilling fluid transports cuttings from the borehole 624 into the pit 824 and aids in maintaining the integrity of the borehole 624. Various materials can be used for drilling fluid, including a salt-water based conductive mud.

In an upper part of the borehole 624 (further referred to as the casing section), a circular cylindrical bore of the wellbore 800 is defined by a tubular steel casing 612 located co-axially in a widened top section of the borehole wall 618, so that the inner diameter of the wellbore 800 in the casing section is lined by the casing 612. The casing 612 may have perforations along certain parts of its length, to allow ingress of hydrocarbons in liquid form into the wellbore 800, through the casing 612.

An assembly of logging while drilling (LWD) tools is may be integrated into a bottom-hole assembly (BHA) 826 near the bit 814. As the bit 814 extends the borehole 624 through the formations 818, LWD tools collect measurements relating to various formation properties as well as the tool orientation and various other drilling conditions. The LWD tools may take the form of a drill collar, i.e., a thick-wall led tubular that provides weight and rigidity to aid the drilling process. A telemetry sub may be included to transfer images and measurement data to a surface receiver and to receive commands from the surface. In some embodiments, the telemetry sub does not communicate with the surface, but rather stores logging data for later retrieval at the surface when the logging assembly is recovered.

The wellbore 800 of FIG. 8 is shown as including an array of the seismic sensor tools 600 installed in the annular cavity defined between the casing 612 and the borehole wall 618 in the casing section. Note that the relative proportions of the tools 600, casing 612, and borehole 624 are not to scale, being enlarged for purposes of schematic representation. In this example, the array of sensor tools 600 comprises a series of axially extending, circumferentially spaced rows of sensor tools 600. While each row of sensor tools 600 is illustrated in FIG. 8 as comprising two of the sensor tools 600, a greater number of sensor tools 600 per row may be employed in other embodiments.

The circumferential arrangement of sensor tools 600 about a central longitudinal axis of the borehole 624 is substantially rotationally symmetrical, by which is meant that the arrangement of tools 600, when the wellbore is viewed in an axial direction, is substantially identical to their arrangement when rotated through an angle of 360°/n (where n is a an integer representing the number of tools 600 in a cross-section of the installation at the relevant depth). In the illustrated example of FIG. 8, for example, the array of tools 600 may comprise four identical rows, spaced apart by 90°, so that each tool 600 is diametrically opposed by a substantially identical tool 600 at the same depth. In other embodiments, for example, the array may comprise three vertically extending columns or rows of tools 600 defining 120° a circumferential spacing between adjacent rows.

It will be appreciated that such rotationally symmetrical arrangement of the tools 600 about the casing 612 will result in automatic centering of the casing 612 in the borehole 624, if equal radially inward wedging forces are exerted by all of the tools 600 located at the same depth. Based on the previously described configuration of the respective actuators 100 of the tools 600, it will be understood that any two of the actuators 100 exposed to identical ambient drilling fluid pressures will exert identical wedging forces pushing radially outwardly against the borehole wall 618 and pushing radially inwardly against the casing 612. This is because the wedging force of each tool 600 is caused by actuation of the plunger 106 through hydraulic action of the drilling fluid 204.

A method of deploying or installing the array of sensor tools 600 can in such cases comprise positioning each of the sensor tools 600 in a desired target position, and thereafter increasing pressure levels in the drilling fluid 204 located in the annular cavity around the casing 612 to above-threshold levels for the respective actuators 100. When the activation threshold is exceeded, the respective rupture discs 136 fail, causing deployment of the respective anchoring mechanisms 606. Note that, in some embodiments, tools 600 deployed at different depths may be provided with rupture discs 136 whose pressure rating is selected so that all of the tools 600 of the array have the same threshold pressure for triggering deployment. In other embodiments, each tool 600 may be customized to have a trigger pressure that corresponds to a particular depth at which it is to be deployed. Such a tool 600 can be placed into position around the casing 612 by lowering it downwards along the annular cavity until it reaches the target depth, at which point the tool 600 automatically deploys and is wedged in place.

Once all of the tools 600 in the array have been deployed, the cumulative effect of the respective wedging forces exerted on the casing by the tools 600 will be to center the casing 612 in the casing section of the borehole 624, thus ensuring co-axial alignment of the casing 612 with the borehole 624. Each tool 600 is moreover firmly engaged both with the borehole wall 618 and with the casing 612, thus allowing reliable measurement by the respective sensor pads 636 of seismic activity to which it is exposed. In some embodiments, the annular cavity between the casing 612 and the borehole wall 618 can thereafter be filled with concrete which, once said, permanently installs of the deployed sensor tools 600 in position around the casing 612.

Note that the above-referenced described deployment and use of the array of sensor tools 600 in the casing section need not occur while the drill string 808 is located in the wellbore 800, as illustrated in FIG. 8. Furthermore, the drill string 808 may incorporate one or more tools having pressurize-activated hydraulic actuator 100 such as that described in various embodiments above. In some embodiments, for example, the drill string 808 may carry one or more of the seismic sensor tools 600 similar or analogous to one or more of the example embodiments described herein.

Figure 9:
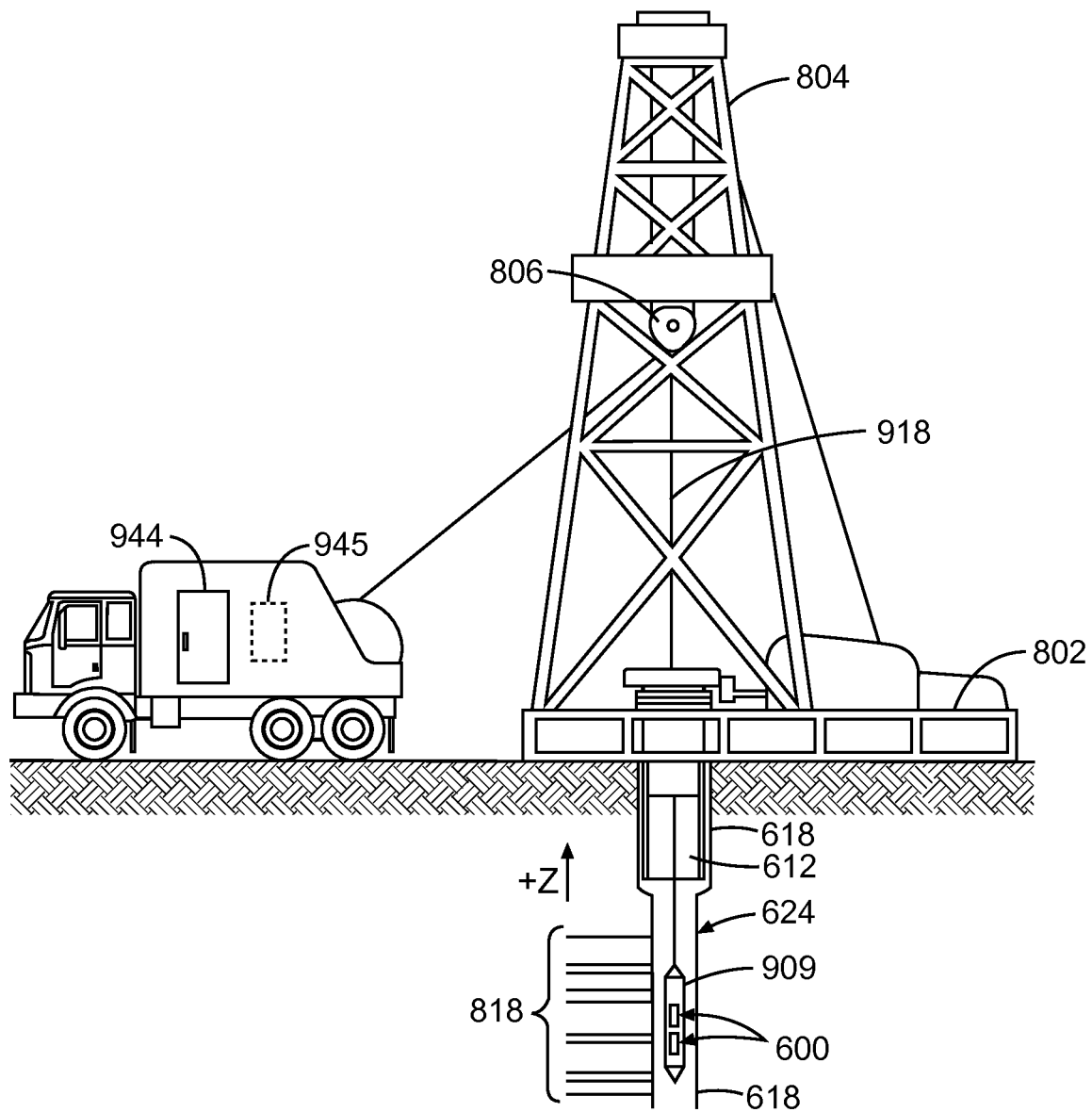
FIG. 9 depicts a schematic overview of a wellbore installation comprising a wireline logging system, in accordance with an example embodiment.

At various times during the drilling process, the drill string 808 may be removed from the borehole 624, as shown in FIG. 9. Once the drill string 808 has been removed, logging operations can be conducted using a wireline logging sonde 909, i.e., a probe suspended by a cable 918 having conductors for conducting power to the sonde 909, and for transmitting telemetry data from the sonde 909 to the surface. A logging facility 944 collects measurements from the logging sonde 909, and includes a computer system 945 for processing and storing the measurements gathered by the sensors.

The example wireline logging sonde 909 may have pads and/or centralizing springs to maintain the sonde 909 near the central axis of the borehole 624, while the sonde 909 is stationary and/or while the sonde 909 is axially displaced along the borehole 624. In some embodiments, tools or anchoring mechanisms provided on the sonde 909 may be configured for pressure-controlled triggering and for drilling fluid actuation by incorporation of an actuator 100 similar or analogous to those described above. An example of such an automatically centering anchoring mechanism and/or tool can be seen with reference to FIG. 14. The sonde 909 in some example embodiments carries a plurality of seismic sensor tools 600 similar or analogous to one or more of the example embodiments described. The different tools 600 on the sonde 909 may be arranged for pressure-triggered activation at different ambient fluid pressures, thus enabling a series of single use activations of the different tools 600 at different depths.

The logging sonde 909 can also include one or more tools configured for operation during forced engagement with the borehole wall 618. In the example embodiment of FIG. 9, the sonde 909 is schematically shown as including a plurality of sensor tools 600 similar or analogous to those described above, for taking seismic measurements at desired downhole locations. As before, the different tools 600 forming part of the sonde 909 can be configured for automated deployment in response to different respective threshold drilling fluid pressure conditions.

In other embodiments (see, for instance, the example embodiment of FIG. 13) a plurality of actuators 100 may be incorporated in a single tool 600, being configured for sequential, staggered deployment at different respective drilling fluid pressures. This allows for hydraulic triggering and actuation of an anchoring mechanism or securing mechanism forming part of the tool 600 at a number of different downhole positions along the borehole 624. A first actuator 100 or tool 600 incorporated in the sonde 909 can thus, for example, be activated at a first target position, either by controlled increase in drilling fluid pressure, or in response to reaching a depth at which the ambient drilling fluid pressure corresponds to a first trigger pressure. After the deployed tool 600 has performed desired operations at the first target position (e.g., taking seismic measurements), the corresponding deployed actuator 100 can be deactivated or retracted by remotely controlling the drilling fluid pressure such that it exceeds a deactivation pressure of the first actuator 100, which may be lower than a trigger pressure for causing deployment of the second actuator 100. After such release of the sonde 909, it may be moved further downhole to a second target position, at which the second actuator 100 may be hydraulically deployed in the above-described manner. This sequence of activation and subsequent deactivation can be performed for a number of times corresponding to the number of actuators 100 carried by the sonde 909 and forming part of one or more tools 600 on the sonde 909.

It should be appreciated that, although in this example embodiment, the use of a plurality of differently rated actuators 100 configured for staggered tool deployment is used together with a sensor tool 600, other embodiments may provide for similar or analogous multi-actuator staggered deployment in conjunction with downhole tools having different functions. Note that although the example embodiment discloses a pair of actuators 100 incorporated in a single seismic sensor tool 600, other embodiments provide for incorporation of three or more of actuators 100 in the tool 600.

Figure 10:
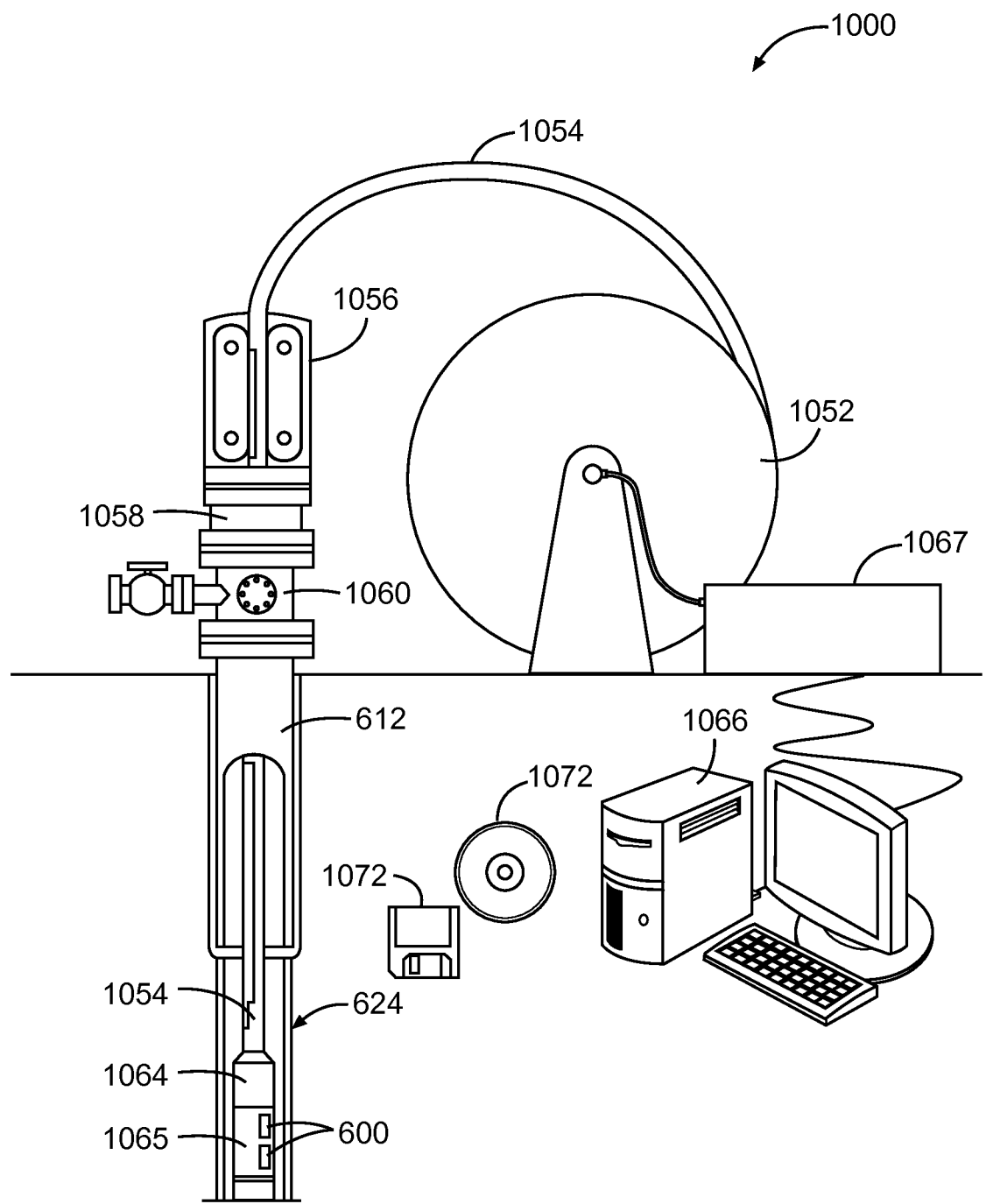
FIG. 10 depicts a schematic overview of a wellbore installation comprising a coiled tubing logging system, in accordance with an example embodiment.

Yet a further technique by which sensor tools and/or hydraulic actuators according to the disclosure can be employed in a downhole drilling environment is illustrated in FIG. 10, which shows an example embodiment of a coil tubing system 1000. In system 1000, coil tubing 1054 is pulled from a spool 1052 by a tubing injector 1056 and injected through a packer 1058 and a blowout preventer 1060 into the borehole 624. In the borehole 624, a supervisory sub 1064 and one or more logging and/or measurement tools 1065 are coupled to the coil tubing 1054 and configured to communicate to a surface computer system 1066 via information conduits or other telemetry channels. In this example embodiment, the downhole tools 1065 include a plurality of tools 600 similar or analogous to those described above. In other embodiments, a single tool 600 may be provided with a plurality of actuators 100 configured for hydraulic actuation and release at different respective drilling fluid pressures. The downhole tools 1065 may be employed in a manner similar to that described above with reference to the sonde 909 of FIG. 9.

An uphole interface 1067 may be provided to exchange communications with the supervisory sub 1064 and receive data to be conveyed to the surface computer system 1066.

Surface computer system 1066 is configured to communicate with supervisory sub 1064 to set logging parameters and collect logging information from the one or more logging tools 1065. Surface computer system 1066 is configured by software (shown in FIG. 10 as being stored on example embodiments of removable storage media 1072) to monitor and control downhole instruments 1064, 1065. The surface computer system 1066 may be a computer system such as that described with reference to FIG. 10.

Note that various modifications to above-described example actuators 100 and tools 600 can be made without departing from the scope of the disclosure. Some modifications and variations (which represent only a non-exhaustive selection of possible modifications and variations) will now be described with reference to FIGS. 11-16. FIG. 11 shows an example embodiment of a seismic sensor tool 600 which is analogous in function and configuration to that described with reference to FIG. 6, but having an oppositely oriented actuator 100 connected to a differently configured anchoring mechanism 606. As will be seen by comparing the sequential modes of operation illustrated in FIGS. 11A-11C, the actuator 100 of FIG. 11 is arranged for deployment by exerting a pulling force on the anchoring mechanism 606, increasing retraction of the plunger rod 121 into the housing 103.

The actuator 100 of FIG. 11 thus has a compression spring 505 located in the compression chamber 115, exerting a biasing force against retraction of the plunger rod 121 into the housing 103. The anchoring mechanism 606 comprises a coupling member in the form of a wedging lever 1104 which is pivotable as a first order lever about a fixed fulcrum 1107 and is connected to the plunger rod 121 by a link member 1110. The fulcrum 1107 is in this example provided by a fixed bracket 1113 fast with the frame 630.

In an initial dormant condition (FIG. 11A), the plunger 106 is in a more or less maximally extended position, which corresponds to the wedging lever 1104 lying more or less flat relative to the frame 630, so that a width of the tool 600 is sufficiently small to permit axial movement of the tool 600 along the borehole 624 or the annular cavity between the casing 612 and the borehole wall 618, as the case may be.

When the activation rupture disc 136 fails in response to ambient drilling fluid pressures exceeding its pressure rating, the tool 600 is automatically disposed to a deployed condition (FIG. 11B) in which the activated anchoring mechanism 606 wedges the tool 600 in place, resisting axial displacement along the borehole 624. During such deployment, the plunger head 118 is driven further into the housing 103 by hydraulic action of the drilling fluid 204, causing a distal end of the wedging lever 1104 to be pulled downwards and towards the housing 103 by the link member 1110, which is pivotally connected at opposite ends to the plunger rod 121 and wedging lever 1104, respectively. As a result, the wedging lever 1104 is pivoted upward around the fulcrum 1107, extending transversely to the plunger rod 121 and forcibly engaging and anchor surface or cavity wall provided, e.g., by the borehole wall 618, an inner diameter of the casing 612, or an outer diameter of the casing 612, as the case may be.

The anchoring mechanism 606 may in some embodiments comprise a mechanical advantage mechanism, being configured to translate displacement of an actuated member (here, the plunger 106) to displacement at least part of a coupling member (here, the expansion joint 728 provided together with the pivoted links 707) with mechanical advantage. Anchoring mechanisms 606 such as that shown in FIG. 7, for example, are in some embodiments constructed such that axial travel of the plunger 106 in the deactivation stroke is shorter than the radial travel of the expansion joint 728. Through operation of leverage, a radial force exerted on the relevant cavity wall (here, the borehole wall 618) is greater than an actuating force applied to the anchoring mechanism via the plunger rod 121. It will be appreciated that exertion of a relatively greater radial anchoring force on the cavity wall 618 is more likely to result in effective anchoring of the tool 600 against axial movement, and would be the case for a relatively smaller anchoring force. Increased contacting forces exerted by the anchoring mechanism 606 further promote efficient transfer of seismic waves or signals across the tool/formation contact interface. Note that some of the described example embodiments provide different mechanical advantage mechanisms, but that a variety of mechanical advantage mechanisms or configurations can be used in cooperation with the actuator 100 for transverse displacement of a coupling member into contact with the cavity wall. Some alternate the mechanical advantage mechanisms include, for example, screwing mechanisms, levers, inclined surfaces, and hydraulic force amplifiers.

The tool 600 remains in the deployed condition of FIG. 11B until the drilling fluid pressure exceeds a threshold pressure of the deactivation disc 306, in response to which the deactivation disc 306 fails, thereby causing automated hydraulically driven deactivation of the anchoring mechanism 606 (see FIG. 11C). During such deactivation, the wedging lever 1104 is pivoted in a direction opposite to its movement during deployment, bringing the wedging lever 1104 back more or less to its original retracted position. The tool 600 now again has a reduced width relative to its width in the deployed condition (FIG. 11B), allowing axial movement of the tool 600 along the borehole 624.

Figure 12B:
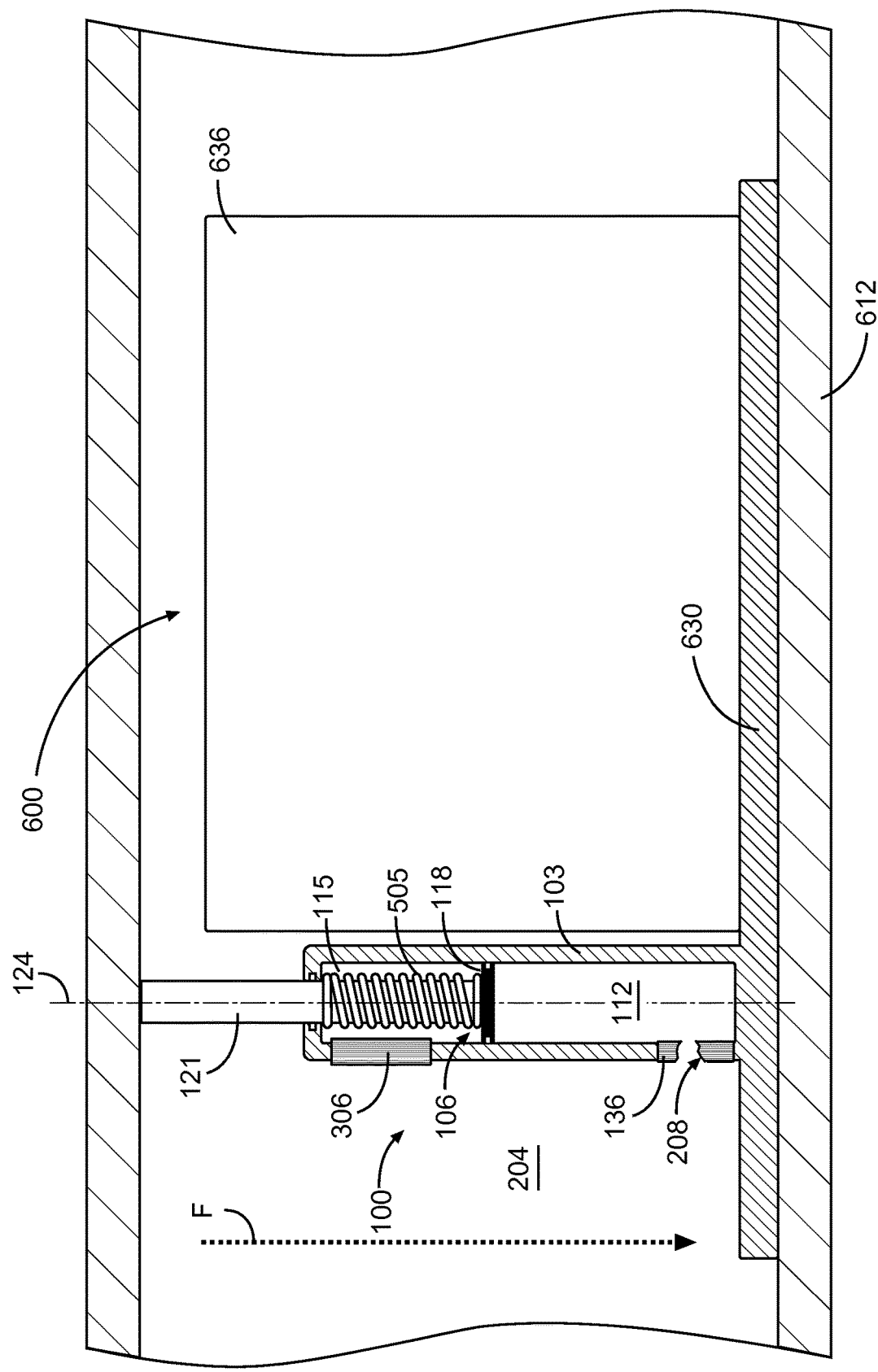

FIG. 12 shows an example embodiment in which the plunger 106 forms part of the anchoring mechanism 606. In this example embodiment, the plunger rod 121 serves as the coupling member of the anchoring mechanism 606, directly engaging the relevant cavity wall to anchor the tool 600 in position and to mechanically couple it to the structure by physical contact therewith. The plunger rod 121 is in this example embodiment configured for transverse extension to mechanically engage the relevant cavity wall or anchor structure by direct contact therewith. In the example embodiment of FIG. 12, the housing 103 and frame 630 are of monolithic or one-piece construction, with a longitudinal axis 124 of the actuator housing 103 extending transversely to a longitudinal direction of the frame 630 (which is in this example configured for alignment with the longitudinal axis of the borehole wall 618, in use). Operation of the actuator 100 of FIG. 12 is similar or analogous to that described previously with respect to other embodiments, with a distinction that, in the deployed condition (FIG. 12B), the plunger rod 121 is hydraulically urged laterally or transversely to the borehole axis, in this example being urged in a radially outward direction relative to the lengthwise axis of the borehole 624. In the schematic illustration of FIG. 12, the tool 600 is located within the central bore defined by the casing 612, so that actuated deployment of the plunger rod 121 presses it against the inner diameter of the casing 612, causing the frame 630 to be pressed forcefully against a diametrically opposite portion of the inner diameter of the casing 612.

The frame 630 of the tool 600 is thereby wedged or anchored into position by a transverse anchoring or coupling force (F), resulting in axially acting frictional resistance to axial displacement by engagement of the plunger rod 121 and frame 630 with the casing 612. As is the case with the various example embodiments, the magnitude of frictional resistance to displacement of the tool 600 is proportional to the magnitude of the wedging force exerted against the casing 612 (and/or, in some embodiments, against the borehole wall 618).

Figure 12C:
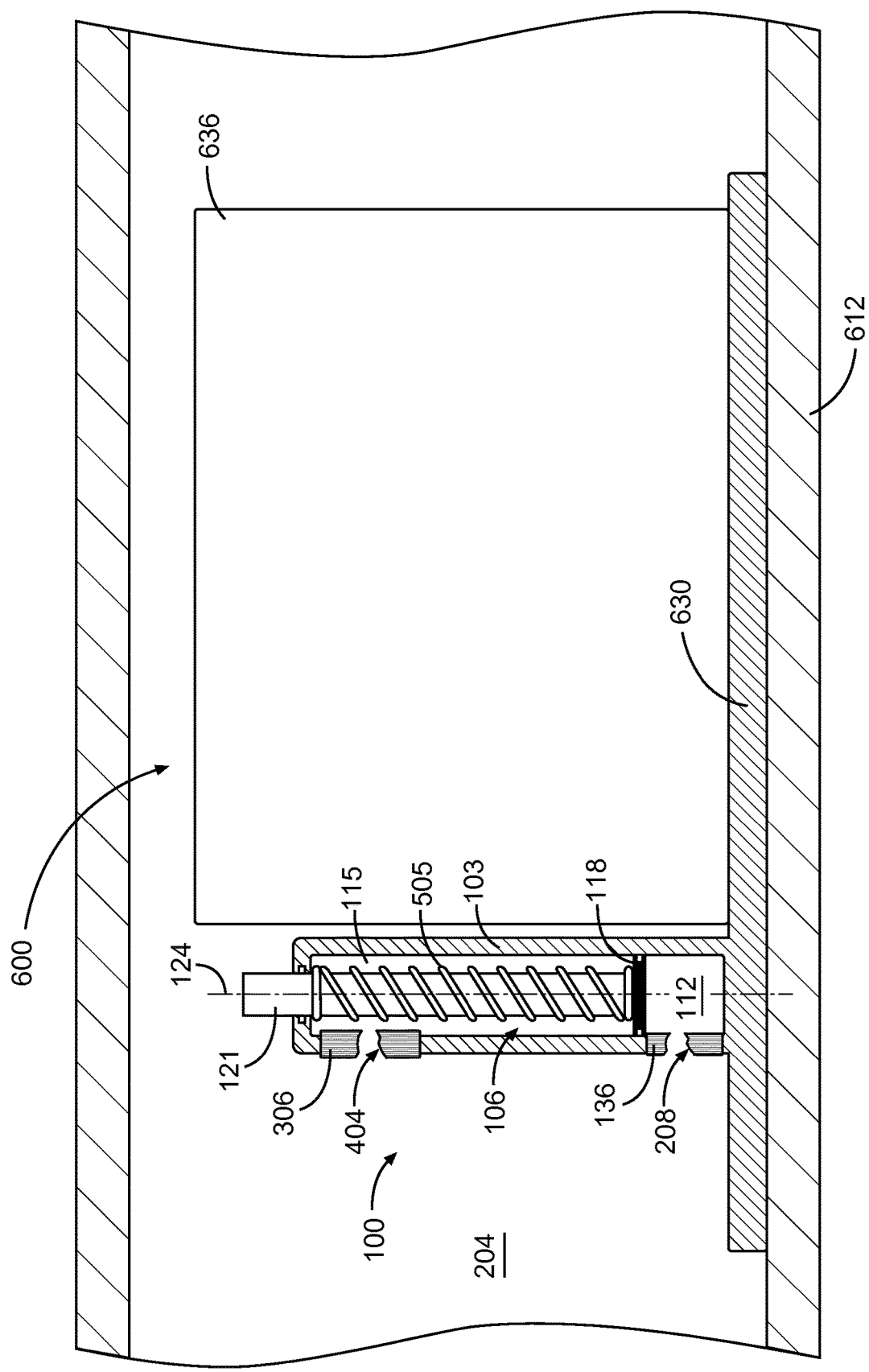

When the activated tool 600 (FIG. 12B) is to be released, the drilling fluid pressure is ramped up to exceed the threshold pressure of the deactivation disc 306, resulting in automated cessation of radially outward actuation of the plunger rod 121 and consequent decoupling of the tool 600 from the casing 612, as illustrated in FIG. 12C. In embodiments, such as that of FIG. 12, in which the actuator 100 includes a return mechanism (here, provided by the spring 505), deactivation of the actuator 100 triggers automatic retraction of the anchoring mechanism's coupling member (here, the plunger rod 121) from the cavity wall with which it was mechanically coupled by forced physical contact. Such decoupling of the sensor tool 600 from the cavity wall (here, the inner diameter of the casing 612) not only releases the tool from being anchored against the casing and allowing free axial movement of the tool, but also severs the mechanical or seismic connection between the casing 612 and the sensor pad 636 previously provided by forced physical contact of the anchoring mechanism 606 against the casing 612. When thus decoupled, seismic waves transmitted from the formation to the casing (e.g., by direct contact or by set concrete filling the annular space around the casing 612) must now necessarily travel, for at least a part of its path, through a fluid medium (here, provided by the borehole fluid or drilling mud in the interior of the casing 612).

Figure 13:
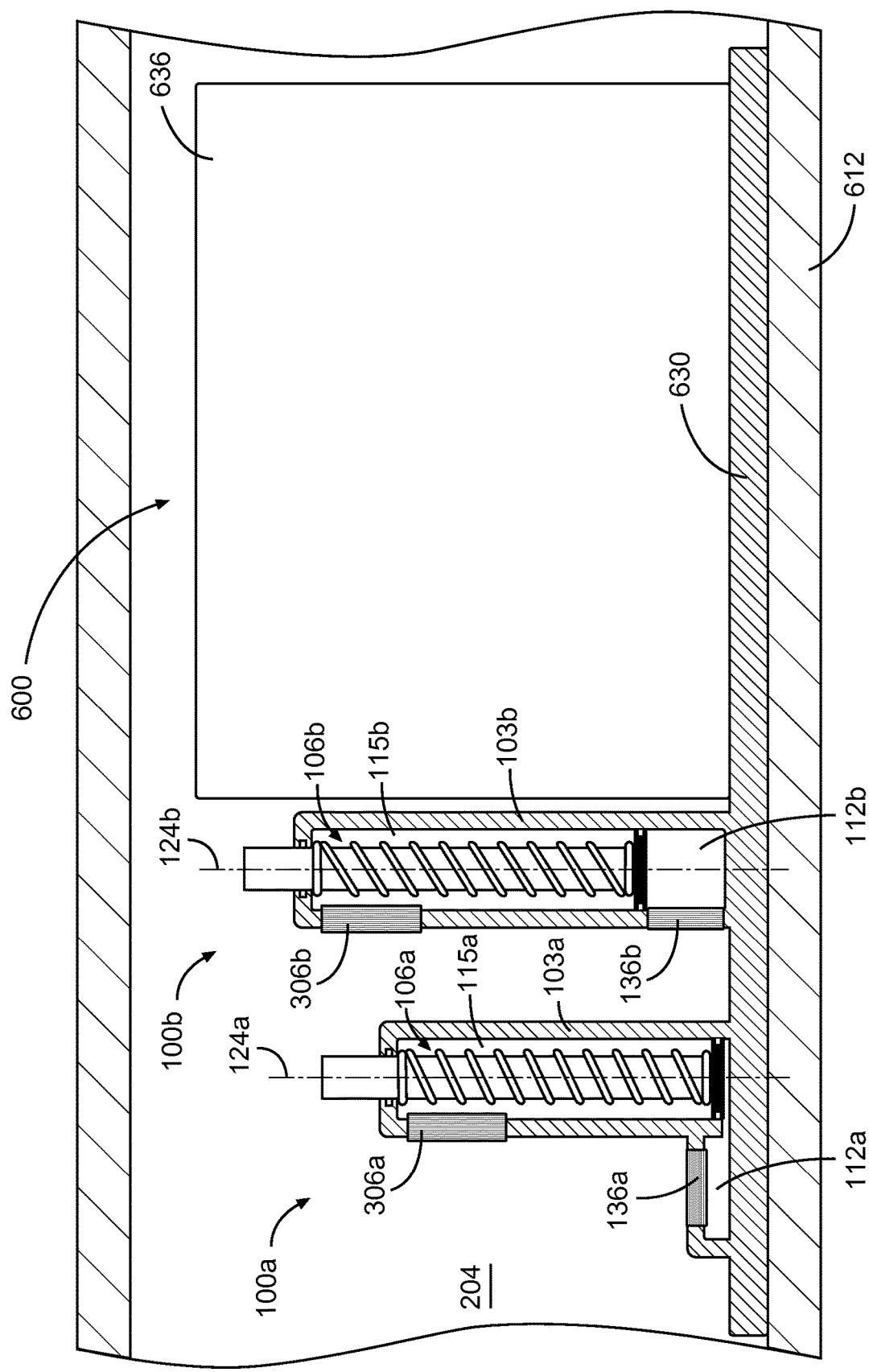
FIG. 13 depicts a schematic axial section of a seismic sensor having a multi-actuator anchoring mechanism accordance with an example embodiment.

FIG. 13 shows a multi-actuator sensor tool 600 in accordance with another example embodiment. The tool 600 of FIG. 13 is analogous to the tool 600 of FIG. 12, with a major distinction being that the tool 600 of FIG. 13 incorporates not just one, but two distinct actuators 100a, 100b. Each actuator has a separate housing 103a, 103b with a respective plunger 106a, 106b. As mentioned previously, the respective actuators 100a, 100b can be configured for deployment and retraction at different drilling fluid pressures. In this example embodiment, a first one of the actuators 100a is configured for deployment at relatively lower drilling fluid pressures or borehole depths, while a second one of the actuators 100b is configured for deployment at relatively higher drilling fluid pressures. The tool 600 is moreover configured such that a threshold pressure of the activation rupture disc 136b (of the second actuator 100b) is higher than the threshold pressure of the deactivation disc 306a (of the first actuator 100a).

A sequence of pressure-activated hydraulically actuated deployment/retraction events performed by the tool 600 of FIG. 13 may thus include:

activation of the first actuator 100a at a lowermost threshold pressure (e.g., 30 bar in a first example, or, in a second example at much higher well pressures, 5 bar above default well pressure at the tool), triggered by automatic failure of the first activation rupture disc 136a, thereby to lock the tool 600 axially in place within the casing at the first measurement position, with continuous actuation of the transversely disposed plunger rod 121a through hydraulic action of the pressurized drilling fluid 204 ensuring solid contact between the tool 600 and the casing 612 for promoting effective measurement of seismic activity at the first measurement position by the sensor pad 636;

subsequent activation of the first actuator 100a at a lower intermediate threshold pressure (e.g., 35 bar in first example, or 10 bar above default well pressure in the second example), triggered by failure of the first deactivation disc 306a, allowing axial displacement of the tool 600 among the casing 612 to a second measurement position;

subsequent activation of the second actuator 100b at a higher intermediate threshold pressure (e.g., 40 bar in the first example, or 15 bar above default well pressure in the second example), triggered by automatic failure of the second deactivation disc 306b, thereby to lock the tool 600 axially in place within the casing at the second measurement position, with continuous actuation of the transversely disposed plunger rod 121b through hydraulic action of the pressurized drilling fluid 204 ensuring solid contact between the tool 600 and the casing 612, to promote effective measurement of seismic activity at the second measurement position by the sensor pad 636; and subsequent deactivation of the second actuator 100b at a uppermost threshold pressure (e.g., 45 bar in the first example, or 20 bar above the default well pressure in the second example), triggered by failure of the second deactivation disc 306b, thereby to allow further displacement or axial removal of the tool 600 from the casing 612.

Note that the housing 103a of the first actuator 100a has a configuration different from those of previously described embodiments in which the housing 103 is a hollow cylinder, the activation chamber 112 and the compression chamber 115 being axially aligned cylindrical cavities together constituting the cylinder volume 109. The activation chamber 112a and compression chamber 115a of the first housing 103a in FIG. 13 has, instead, a laterally offset, parallel arrangement. Such modifications/changes do not alter the mechanism operation mechanism of operation described above of the actuator 100a (as compared with, for example, the actuator 100b), because the activation rupture disc 136a and the plunger 106a are in flow connection via a passageway or fluid conduit defined by the housing 103a. The modified actuator 100a, however, is more compact in its width dimension (e.g., parallel to the plunger axis 124 and extending diametrically across the casing 612. It will be appreciated that such modifications of the housing configuration (which modifications may in some instances comprise a pair of more or less equal-length cylindrical chambers located side-by-side, can provide for increases in plunger stroke length and/or force, while still fitting widthwise in the borehole 624, with clearance, to allow axial movement of the dormant or deactivated tool 600 along the borehole 624.

FIG. 14 shows part of another example embodiment of a seismic tool, being a seismic sensor tool 600 having an anchoring mechanism 606 configured for rotationally symmetrical expansion or dilation. Such anchoring mechanisms 606 may be used for centering of the housing 103 in an axially extending cavity, such as the borehole 624, in which it may be located.

The anchoring mechanism 606 of FIG. 14 comprises a linkage having a pair of diametrically opposite link pairs, each link pair comprising two links 1421 of equal length pivotally connected together at their adjacent ends to form a respective jackknife joint 1428. The distal end of each link 1421 (here, the end furthest from the jackknife joint 1428) is pivotally connected to a respective crosspiece (1414 or 1415, as the case may be). The crosspieces 1414, 1415 are approximately parallel, extending transversely both to the longitudinal axis 124 of the plunger rod 121 and to the links 1421 when they are longitudinally aligned end-to-end in the dormant condition (shown in FIG. 14A). One of the crosspieces 1414 is connected to the actuator housing 103 by a rigid bar 1407 that keeps the crosspiece 1414 in a static spatial relationship relative to the actuator housing 103. The other crosspiece 1415 is mobile relative to the housing 103, being mounted on the distal end of the plunger rod 121 for movement with the plunger rod 121 relative to the housing 103.

A longitudinal spacing between the cross pieces 1414, 1415 is thus variable in response to actuated movement of the plunger 106 in the housing 103. When the plunger 106 is in a fully extended position corresponding to the dormant condition of the anchoring mechanism 606, the links 1421 of each pair are longitudinally aligned, lying flat against the sides of the actuator housing 103, so that the width of the anchoring mechanism 606 (represented by the transverse spacing between the jackknife joints 1428) is more or less equal to the length of the crosspieces 1414, 1415, thus allowing operator-controlled movement of the anchoring mechanism 606 along the borehole 624.

When, however, the activation rupture disc 136 fails due to above-threshold drilling fluid conditions, the plunger 106 is actuated by hydraulic action of the drilling fluid to retract the plunger 106 into the housing 103, thus moving the mobile crosspiece 1415 forcibly closer to the static crosspiece 1414, shortening the overall length of the anchoring mechanism 606. As a result, the links 1421 pivot outwards, causing radially outward movement of the jackknife joints 1428 for bracing against the borehole wall at diametrically opposite positions (FIG. 14B).

Note again that the deployed anchoring mechanism 606 provides a mechanical link or seismic pathway between the actuator housing 215 (and therefore to the sensor pad 636 incorporated in a sensor tool of which the anchoring mechanism 606 forms part). Seismic signals or waves arriving at the physical contact interface of the jackknife joint 1428 against the borehole wall 618 is transferable to the body of the tool by a rigid components comprising the link 1421, static crosspiece 1414, and link 1421, at least.

When the anchoring mechanism 606 is to be released, the drilling fluid pressure at the downhole position of the deployed anchoring mechanism 606 is raised above the threshold pressure of the deactivation disc 306. This results in exposure of the compression chamber 115 [to the ambient drilling fluid, resulting in equalization of the fluid pressures in the compression chamber 115 and the activation chamber 112, allowing axial movement of the plunger 106 back to its fully extended position under action of the compression spring 505 mounted in the compression chamber 115. The resulting increase in spacing between the crosspieces 1414, 1415 causes the links 1421 to pivot inwards, so that the jackknife joints 1428 are retracted radially inwards to once again lie flat against the actuator housing 103. The anchoring mechanism 606 is thus released from being anchored in a particular downhole position, to allow operator-controlled movement of the anchoring mechanism 606 (and therefore of a tool of which it might form part) along the borehole 624.

Figure 15B:
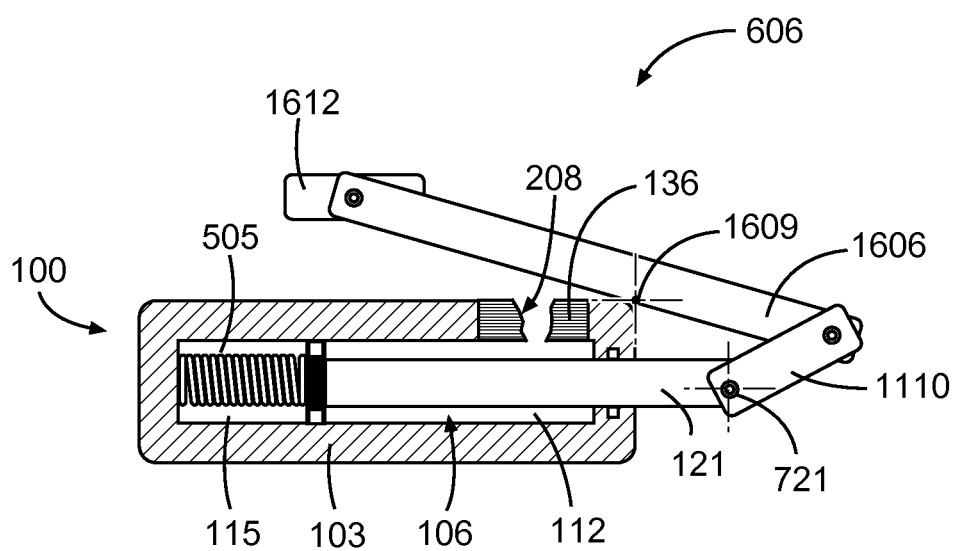

FIG. 15 shows an example embodiment of an anchoring mechanism 606 forming part of a seismic sensor tool similar to that described with reference to FIG. 11. The anchoring mechanism 606 of FIG. 15 is broadly similar in construction and function than the corresponding mechanism of the FIG. 11 example, without having a fixed fulcrum for the wedging lever 1104, and without an anchor point that connects it directly to the frame 630 (although, it should be noted, that the actuator housing 103 is rigidly connected to the frame (not shown in FIG. 15) for providing a substantially continuous mechanical link between a sensor mounted on the frame and the point of contact provided by the anchoring mechanism 606). As will be seen by comparing the respective modes of operation illustrated in FIGS. 15A and 15B, the actuator 100 of FIG. 15 is arranged for deployment by exerting a pulling force on the anchoring mechanism 606, increasing retraction of the plunger rod 121 into the housing 103.

The actuator 100 of FIG. 15 thus has a compression spring located in the compression chamber 115, exerting a biasing force against retraction of the plunger rod 121 into the housing 103. The anchoring mechanism 606 comprises a wedging lever 1606 which is pivotable as a first order lever about a floating fulcrum 1609 defined by a pivot point of the wedging lever 1606 on an exterior corner of the actuator housing 103. The wedging lever 1606 is connected to the plunger rod 121 by a link member 1110. The wedging lever 1606 in this example embodiment has a freely pivotable shoe 1612 connected to its free end, to lie flat against the borehole wall when the end of the wedging lever 1606 is forcibly pressed against the borehole wall.

In an initial dormant condition (FIG. 15A), the plunger 106 is in a more or less maximally extended position, which corresponds to the wedging lever 1606 lying more or less flat against one side of the actuator housing 103, so that a width of the anchoring mechanism 606 is sufficiently small to permit axial movement along the borehole 624 or the annular cavity between the casing 612 and the borehole wall 618, as the case may be.

When the activation rupture disc 136 fails in response to ambient drilling fluid pressures exceeding its pressure rating, the tool 600 is automatically disposed to a deployed condition (FIG. 15B) in which the actuated anchoring mechanism 606 wedges the tool 600 in place, resisting axial displacement along the borehole 624. During such deployment, the plunger 106 is driven further into the housing 103 by hydraulic action of the drilling fluid 204, causing a distal end of the wedging lever 1606 to be pulled downwards and towards the housing 103 by the link member 1110. The link member is pivotally connected at opposite ends to the plunger rod 121 and the wedging lever 1606, respectively. As a result, the wedging lever 1606 is pivoted upward around the fulcrum 1609, extending transversely to the plunger rod 121 and forcibly making physical contact engagement with an anchor surface provided by the borehole wall 618 or an inner diameter of the casing 612, as the case may be.

The anchoring mechanism 606 in this position provides a physical link between the actuator housing (and therefore to a sensor forming part of the tool via a tool frame to which the actuator housing is rigidly connected) and the borehole wall. This provides a seismic pathway for transmission of seismic activity, for example via the contact shoe 1612 and the wedging lever 1606. Effective transmission of seismic activity along the seismic pathway is promoted by contact between the wedging lever 1606 and the actuator housing 103 at the fulcrum 1609.

Note that the actuator 100 of the FIG. 15 embodiment does not have a second rupture disc for triggering retraction of the deployed mechanism in response to failure of such a second rupture disc. The deployment mechanism 606 therefore remains in the deployed condition of FIG. 15B until the drilling fluid pressure drops below a threshold pressure at which the sum of the bias force of the compression spring 505 and pneumatic forces from the compression chamber 115 on the plunger 106 exceeds the hydraulic forces exerted by the drilling fluid 204 on the plunger 106. At such below-threshold pressures, the anchoring mechanism 606 is automatically retracted due in part to the urging of the compression spring 505. During retraction, the wedging lever 1606 is pivoted in a direction opposite to its movement during deployment, bringing the wedging lever 1606 back more or less to its original retracted position. The anchoring mechanism 606 now again has a reduced width relative to the deployed condition (FIG. 15B), allowing axial movement of the anchoring mechanism 606 (and a tool to which it is connected) along the borehole 624.

Figure 16A:
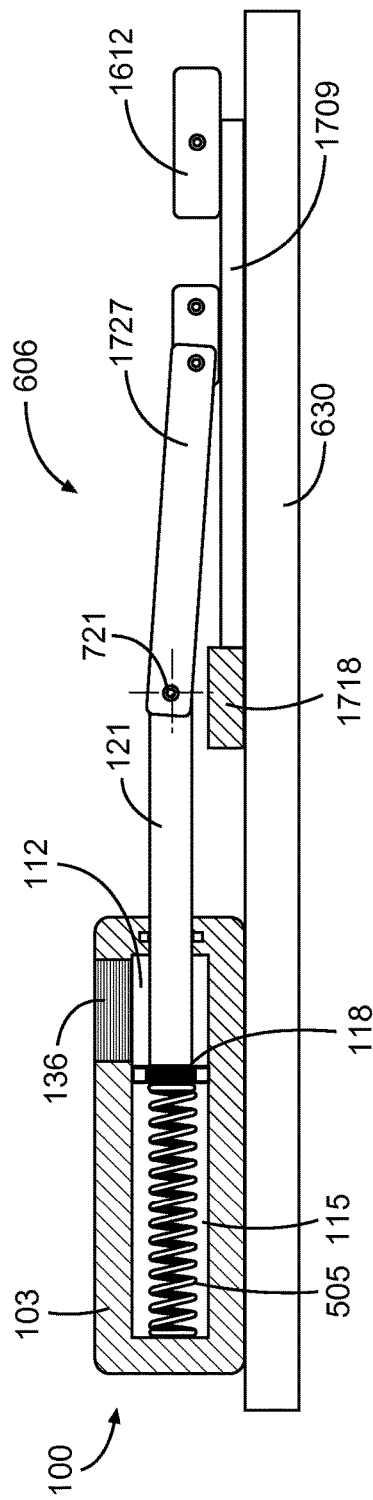
FIGS. 16A-16B depict a series of schematic axial sections of an anchoring mechanism for a downhole seismic sensor tool in accordance with yet another example embodiment, the anchoring mechanism being shown in a dormant condition and in an activated condition, respectively.
Figure 16B:
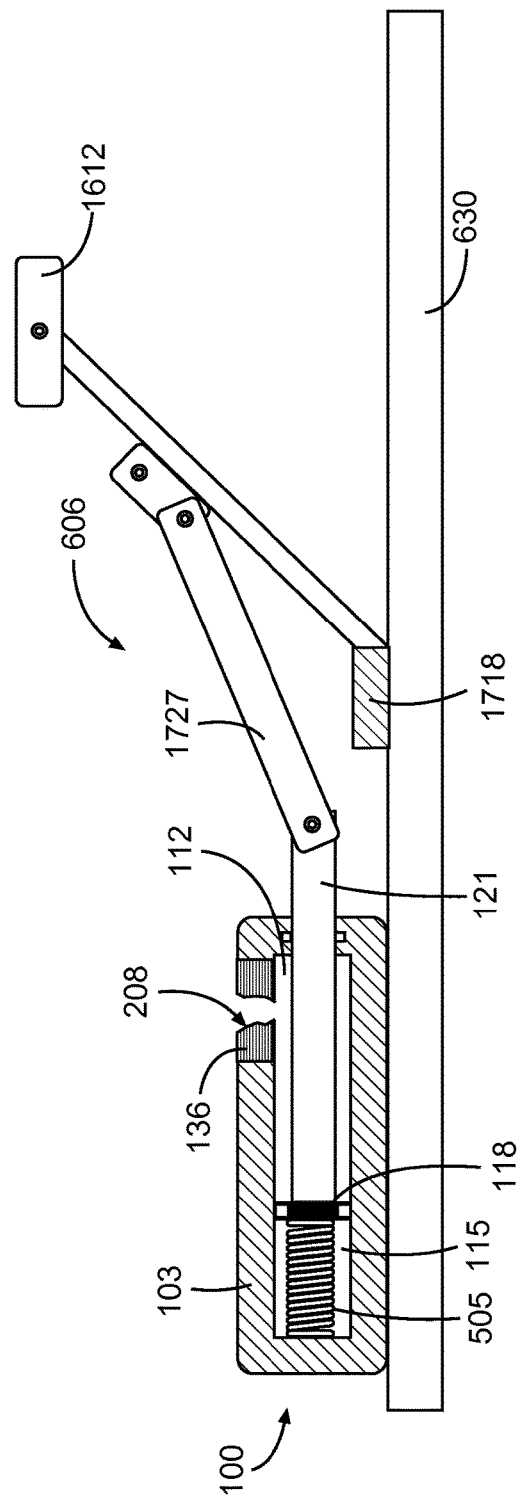

FIG. 16 illustrates another example embodiment of a single-use drilling fluid-actuated and controlled anchoring mechanism 606 forming part in a seismic sensor tool 600 (not shown in FIG. 16). The embodiment of FIG. 16 corresponds largely to the example embodiment described with reference to FIG. 15, one notable distinction being that a wedging lever 1709 is a 3rd order lever, as opposed to the first order wedging lever 1606 of FIG. 15.

The wedging lever 1709 of FIG. 16 is connected at a proximal end thereof to a baseplate providing the frame 630 for pivoting about a fixed fulcrum 1718, with the opposite, distal end of the wedging lever 1709 being provided with a wall-engaging shoe 1612. The wedging lever 1709 is pivotally connected between these two extremities, more or less at its midpoint, to a pull link 1727 which is, at its opposite and, connected pivotally to the end of the plunger rod 121 projecting from the actuator housing 103.

When in the dormant condition (FIG. 16A), the plunger 106 is in a more or less fully extended position on the housing 103, allowing the wedging lever 1709 to lie flat against the baseplate 212 and giving the anchoring mechanism 606 a minimum width dimension (i.e., in the direction transverse to the longitudinal axis of a borehole or cavity in which it is to be inserted for seismic sensing purposes). When, however, the tool of which the anchoring mechanism 606 forms part is exposed to ambient drilling fluid conditions that exceeds the threshold conditions of the activation rupture disc 136, the activation rupture disc 136 fails, causing hydraulically actuated retraction of the plunger 106 further into the housing 103. The proximal end of the pull link 1727 is pulled closer to the housing 103, thereby pulling the pivot point of the pull link 1727 towards the actuator housing 103 as well. As a result, the pull link 1727 pivots outwards (here, away from the baseplate 630) about the fixed fulcrum 1718, until the shoe 1612 is pressed against the borehole wall 618 or casing surface, as the case may be.

Continued application of hydraulic actuating force on the plunger 106 by the ambient drilling fluid continuously exerts an actuating force on the wedging lever 1709 via the pull link 1727, ensuring that the anchoring mechanism 606 continuously lodges the tool of which it forms part firmly in position at a target location. Continuous application of such a contacting force with which the wall engaging portion of the anchoring mechanism 606 (here, the shoe 1612) is forced into contact with the wall also promotes reliable transmission of received seismic signals from the shoe 1612 to a sensor of the tool via a mechanical or seismic link defined at least in part by the shoe 1612, the wedging lever 1709, the fixed fulcrum 1718, and the frame 630.

As is the case with the example embodiment of FIG. 15, release of the anchoring mechanism 606 of FIG. 16 is in this example embodiment designed to be effected by lowering of ambient drilling fluids below a threshold pressure at which the compression spring 505 serves to move the plunger 106 axially further out of the housing 103, causing retractive pivoting of the wedging lever 1709 about the fixed fulcrum 1718.

Benefits of the above-described example seismic tools and seismic sensing methods include that the system may be conveyed by a tubing or deployed with a wireline system, but with added flexibility and performance compared to existing tools using gravitational or monitor-driven coupling.

Because the tool does not employ a motor to drive coupling, it is of simpler, more reliable construction, while being more cost-effective. Ease of deployment is achieved by providing for wireless activation and operation of the tool, as triggering and actuation of the actuators can be controlled without cable connections or wire connections.

Flexibility of deployment and ease of on-site reconfiguration for particular deployment schemes are provided by the fact that multiple tools can be used with rupture discs having different trigger values. This allows tool coupling at multiple downhole locations during a single run.

Even though the described seismic tools and systems provide a lower-cost and lower-complexity solution to ensure contact to the formation downhole, the environmental range at which the tools can be deployed is increased. The described seismic tools can, for example, be employed in downhole environments at temperatures where electronic components typically tend to fail, for example at temperatures in the range of 400° F./200° C. A further benefit is that the extension of the environmental range of the tools enables the use of fiber-optic seismic sensors in combination with the seismic tool. This is because optical fiber typically survives temperatures well above the maximum operating temperature of electric tools.

From the foregoing it can be seen that one aspect of the above-described example embodiments provides an apparatus comprising: a tool body configured for location in a subterranean cavity bordered by a cavity wall and defined within a borehole extending in a formation; a seismic sensor connected to the tool body and configured for detecting seismic activity in the formation;

an anchoring mechanism connected to the tool body and configured for disposal between a dormant mode in which the tool body is decoupled from the cavity wall, and an activated mode in which the anchoring mechanism is in physical contact engagement for enabling reception of seismic signals at the cavity wall for detection by the seismic sensor;

an actuator configured to actuate deployment of the anchoring mechanism from the dormant mode to the activated mode; and a pressure-activated trigger mechanism configured to allow wireless operator control of activation of the actuator by agency of ambient borehole fluid pressure.

The actuator may be configured for hydraulic actuation of the anchoring mechanism by operation of pressurized ambient borehole fluid, and to maintain hydraulic actuation of the anchoring mechanism into contact with the cavity wall subsequent hydraulic actuation of the anchoring mechanism.

In some example embodiments, the actuator comprises:
an actuator housing having a hollow interior that defines an activation chamber; and
an actuated member displaceably mounted on the actuator housing and configured for hydraulically actuated movement in an activation direction relative to the activator housing in response to exposure of the activation chamber to pressurized ambient borehole fluid, and wherein the anchoring mechanism includes a coupling member configured such that actuated displacement of the actuated member in the activation direction causes forced engagement of the coupling member with the cavity wall, thereby to secure the tool body in the cavity and to physically contact the cavity wall.

The coupling member (also referred to herein as a coupling member) may be provided by the actuated member, with the actuated member being configured for direct forced engagement with the cavity wall (see, for example, FIG. 12).

The actuator may be mounted on the tool body such that the activation direction is transverse to a lengthwise direction of the borehole, so that that the actuated member is configured for being urged transversely to the lengthwise direction of the borehole into contact with the cavity wall when the anchoring mechanism is in the activated mode.

In some embodiments, the coupling member is operatively connected to the actuated member by a mechanical linkage. The mechanical linkage may be configured to convert displacement of the actuated member into displacement of the coupling member, with mechanical advantage. The mechanical linkage may thus be configured to cause exertion of a contacting force, at the coupling member, that is greater than an actuating force experienced by the actuated member.

The mechanical linkage may be configured to convert displacement of the actuated member in the activation direction to displacement of at least a wall engaging portion of the coupling member in a direction transverse to the activation direction. In some embodiments, the tool body and the actuator may be configured for location in the cavity in an operative orientation in which the activation direction is substantially aligned with a lengthwise direction of the borehole. See, for example, the embodiment described with reference to FIG. 6. The mechanical linkage may be anchored to the tool body at an anchor point such as to prevent translation of the mechanical linkage relative to the tool body at the anchor point.

The actuator may be a single-use actuator configured to allow actuation of the anchoring mechanism from the dormant mode to the activated mode by use of the actuator only once. The apparatus may in such a case comprise one or more additional actuators, so that the apparatus comprises a plurality of actuators having different respective pressure thresholds for triggering activation thereof by operation of ambient borehole fluid pressure.

In some embodiments, the apparatus further comprises an activation chamber closure device mounted on the actuator housing and operable between:
   a closed condition in which the activation chamber is in fluid isolation from the exterior of the actuator housing; and
   an open condition in which the activation chamber is in fluid connection with the ambient borehole fluid,
the activation chamber closure device comprising a frangible closure configured for automatic failure in response to exposure thereof to ambient borehole fluid pressure exceeding a predetermined activation threshold pressure.

The apparatus may further comprise a deactivation mechanism configured for, when the anchoring mechanism in is in the activated mode, deactivating the anchoring mechanism, to decouple the anchoring mechanism from the cavity wall and allow displacement of the tool body within the cavity. The pressure-activated trigger mechanism may further be configured for allowing wireless triggering, by agency of ambient borehole fluid pressure, of the deactivation mechanism, to deactivate the anchoring mechanism.

The apparatus of claim 15, wherein the deactivation mechanism comprises a bias mechanism configured for urging the actuated member in a deactivation direction substantially opposite to the activation direction.

Another aspect of the description includes a method comprising:
   locating a sensor tool in a subterranean cavity defined within a borehole extending in a formation, the sensor tool being exposed to ambient borehole fluid;
   causing predefined activation conditions in the ambient borehole fluid to which the sensor tool is exposed, thereby to trigger actuated activation of an anchoring mechanism forming part of the sensor tool, the activated anchoring mechanism being mechanically coupled with a wall of the cavity to secure the sensor tool in position within the cavity; and
   detecting seismic activity within the formation by operation of a seismic sensor that forms part of the sensor tool and that is mechanically coupled to the formation via the anchoring mechanism.

The cavity in which the sensor tool is located may be provided by an annular space defined between, on the one hand, a radially inner cavity wall provided by a radially outer surface of a hollow cylindrical casing extending co-axially along the borehole, and, on the other hand, a radially outer cavity wall provided by a radially inwardly facing cylindrical borehole wall. The anchoring mechanism may in such a case be configured for securing the sensor tool in position within the annular cavity by actuated engagement of the anchoring mechanism with one or more of the cavity walls such that the anchoring mechanism provides a physical coupling between the tool of the body and the borehole wall, the actuator being configured for continuously urging the anchoring mechanism against the one or more cavity walls, to provide a persistent physical coupling of the seismic sensor to the formation.

The method may further comprise
   locating a plurality of sensor tools in the annular space about the casing; and
   causing pressure-triggered hydraulic actuation of the respective anchoring mechanisms of the plurality of sensor tools, thereby securing each sensor tool in a respective position such that the plurality of sensor tools are arranged in an array of sensor tools about the casing, each of the secured sensor tools providing for a mechanical contact link between the formation and a respective seismic sensor incorporated in the sensor tool. At least that a part of the cavity in which the array is secured maybe filled with a settable material, and the material may be allowed to set, thereby to embed the array of sensor tools in a jacket of solid material that extends radially between the casing and the formation.

Aspects of the disclosure relating to the actuator forming part of the apparatus include that opening of the activation chamber closure member may comprise rupture or failure of the closure member's structural integrity, thereby allowing fluid flow through a rupture or fissure in the closure member that is mounted in the fluid passage. The activation chamber closure device may thus be a frangible closure (e.g., a rupture disc) configured for automatic failure in response to exposure to ambient drilling fluid pressures exceeding an activation pressure corresponding to the activation threshold. The frangible closure and may be removably and replaceably mounted on the housing.

A hollow interior of the actuator housing and the actuated member may together define the activation chamber and a complementary compression chamber sealingly separated from the activation chamber, such that displacement of the actuated member in the activation direction corresponds to expansion of the activation chamber and simultaneous sympathetic compression of the compression chamber. The compression chamber may be a substantially sealed volume containing a compressible fluid. The compression chamber may be gas-filled, in some embodiments be filled with air, and in some embodiments being filled with a noncorrosive gas, such as nitrogen.

The apparatus may comprise a cushioning mechanism configured for exerting on the actuated member resistance to movement thereof in the activation direction, such that the resistance increases in magnitude with an increase in displacement of the actuated member in the activation direction. In some example embodiments, the cushioning mechanism may at least in part be provided by the compression chamber, in which pneumatic resistance to expansion of the activation chamber may automatically result from compression of gas in the compression chamber.

The actuator housing may define a deactivation passage connecting the compression chamber to the exterior of the housing. The apparatus main such case further comprise a compression chamber closure device (also referred to herein as the deactivation closure device) sealingly closing off the deactivation passage and being configured for automatically opening in response to ambient drilling fluid pressures that exceed a predefined deactivation threshold, which may be significantly higher than the activation threshold.

The apparatus may in some embodiments comprise a stopping mechanism configured for mechanically stopping movement of the actuated member in the activation direction beyond a predetermined deployment stroke limit.

The apparatus may further comprise a deactivation mechanism configured for, subsequent to opening of the activation chamber closure device, automatically displacing the actuated member in a deactivation direction, opposite to the activation direction, in response to the establishment of a flow connection between the compression chamber and ambient drilling fluid. The deactivation mechanism may comprise a bias mechanism configured for urging the actuated member in the deactivation direction. The bias mechanism may in some embodiments comprise an elastically deformable spring element operatively connected to the actuated member and configured for exerting on the actuated member a bias force that increases in magnitude with an increase in displacement thereof in the activation direction. The spring element may comprise a resiliently compressible spring located in the compression chamber and configured for lengthwise compression in response to movement of the actuated member in the activation direction.

Two or more of the plurality of different activation closure devices have different respective activation thresholds, allowing operator modification of an operative activation threshold for the actuator mechanism by removal of one activation closure device from the actuating mechanism and replacement thereof by another activation closure device having a different corresponding activation threshold. A single actuator mechanism is thus customizable by an operator for deployment in a range of different applications in which different activation threshold pressures are to apply.

The plurality of different activation closure devices may be of modular construction, having similar respective mounting formations for cooperation with a complementary mounting formation provided by the actuator mechanism. Defined differently, the actuator mechanism and a plurality of the closure devices may provide a modular system allowing for on-site customization or reconfiguration of different actuator mechanisms to have different respective activating pressure thresholds.

In some embodiments, the actuating mechanism may further be configured for automatic deactivation, subsequent to switching of the activation closure device to the opened state, in response to establishment of a flow connection between the ambient drilling fluid and a deactivation volume of the actuator mechanism via a deactivation conduit defined by the actuator mechanism. In such cases, the system may further comprise a plurality of different deactivation closure devices configured for interchangeable, removable and replaceable mounting on the actuator mechanism, each deactivation closure device being configured for, when mounted on the actuator mechanism, substantially closing off the deactivation volume at below deactivation-threshold drilling fluid pressures, and for automatically switching, in response to ambient drilling fluid pressures greater than a corresponding deactivation threshold, to an opened state in which the deactivation volume is in flow connection with ambient drilling fluid via the deactivation conduit.

Note that, in some embodiments, the closure devices and the actuating mechanism may be configured such that the plurality of deactivation closure devices and the plurality of activation closure devices are nonoverlapping sets, with each activation device being mountable in association with only one of the activation conduit on the deactivation conduit. In other embodiments, each closure device may be configured for interchangeable mounting on the actuator mechanism, to serve either as a activation closure device or as a deactivation closure device. In such cases, the plurality of deactivation closure devices and the plurality of activation closure devices may be overlapping sets, in some embodiments being fully overlapping sets provided by a single group of closure devices. Respective mounting formations provided by the actuator mechanism to receive closure devices for the activation conduit and the deactivation conduit respectively may in other words be compatible with the plurality of deactivation closure devices and the plurality of activation closure devices.

As discussed previously, above-threshold wellbore fluid pressure levels at the actuator mechanism may be caused by controlled increase of ambient pressure levels at a given downhole location, and/or may in some embodiments be caused by displacing the actuator mechanism along the wellbore to a particular downhole location at which the ambient fluid pressure levels exceed the activation threshold.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
   a tool body configured for location in a subterranean cavity bordered by a cavity wall and defined within a borehole extending in a formation;
   a seismic sensor connected to the tool body and configured for detecting seismic activity in the formation;
   an anchoring mechanism connected to the tool body and configured for disposal between a dormant mode in which the tool body is decoupled from the cavity wall, and an activated mode in which the anchoring mechanism is in physical contact engagement for enabling reception of seismic signals at the cavity wall for detection by the seismic sensor;

an actuator configured to actuate deployment of the anchoring mechanism from the dormant mode to the activated mode; and a pressure-activated trigger mechanism configured to allow wireless operator control of activation of the actuator by agency of ambient borehole fluid pressure, the trigger mechanism comprising a frangible closure configured for automatic failure in response to exposure thereof to ambient borehole fluid pressure exceeding a predetermined activation threshold pressure.

2. The apparatus of claim 1, wherein the actuator is configured for hydraulic actuation of the anchoring mechanism by operation of pressurized ambient borehole fluid, and to maintain hydraulic actuation of the anchoring mechanism into contact with the cavity wall subsequent hydraulic actuation of the anchoring mechanism.

3. The apparatus of claim 2, wherein the actuator comprises:

an actuator housing having a hollow interior that defines an activation chamber; and an actuated member displaceably mounted on the actuator housing and configured for hydraulically actuated movement in an activation direction relative to the activator housing in response to exposure of the activation chamber to pressurized ambient borehole fluid, and wherein the anchoring mechanism includes a coupling member configured such that actuated displacement of the actuated member in the activation direction causes forced engagement of the coupling member with the cavity wall, thereby to secure the tool body in the cavity and to physically contact the cavity wall.

4. The apparatus of claim 3, wherein the coupling member is provided by the actuated member, with the coupling member being configured for direct forced engagement with the cavity wall.

5. The apparatus of claim 3, wherein the actuator is mounted on the tool body such that the activation direction is transverse to a lengthwise direction of the borehole, so that that the actuated member is configured for being urged transversely to the lengthwise direction of the borehole into contact with the cavity wall when the anchoring mechanism is in the activated mode.

6. The apparatus of claim 3, wherein the coupling member is operatively connected to the actuated member by a mechanical linkage.

7. The apparatus of claim 6, wherein the mechanical linkage is configured to convert displacement of the actuated member into displacement of the coupling member, with mechanical advantage.

8. The apparatus of claim 7, wherein the mechanical linkage is configured to cause exertion of a contacting force, at the coupling member, that is greater than an actuating force experienced by the actuated member.

9. The apparatus of claim 6, wherein the mechanical linkage is configured to convert displacement of the actuated member in the activation direction to displacement of at least a wall engaging portion of the coupling member in a direction transverse to the activation direction.

10. The apparatus of claim 9, wherein the tool body and the actuator are configured for location in the cavity in an operative orientation in which the activation direction is substantially aligned with a lengthwise direction of the borehole.

11. The apparatus of claim 6, wherein the mechanical linkage is anchored to the tool body at an anchor point such as to prevent translation of the mechanical linkage relative to the tool body at the anchor point.

12. The apparatus of claim 3, wherein the actuator is a single-use actuator configured to allow actuation of the anchoring mechanism from the dormant mode to the activated mode by use of the actuator only once.

13. The apparatus of claim 12, further comprising one or more additional actuators, so that the apparatus comprises a plurality of actuators having different respective pressure thresholds for triggering activation thereof by operation of ambient borehole fluid pressure.

14. The apparatus of claim 12, further comprising an activation chamber closure device mounted on the actuator housing and operable between:

a closed condition in which the activation chamber is in fluid isolation from the exterior of the actuator housing; and an open condition in which the activation chamber is in fluid connection with the ambient borehole fluid, the activation chamber closure device comprising the frangible closure.

15. The apparatus of claim 3, further comprising:

a deactivation mechanism configured for, when the anchoring mechanism in is in the activated mode, deactivating the anchoring mechanism, to decouple the anchoring mechanism from the cavity wall and allow displacement of the tool body within the cavity, and wherein the pressure-activated trigger mechanism is further configured for allowing wireless triggering, by agency of ambient borehole fluid pressure, of the deactivation mechanism, to deactivate the anchoring mechanism.

16. The apparatus of claim 15, wherein the deactivation mechanism comprises a bias mechanism configured for urging the actuated member in a deactivation direction substantially opposite to the activation direction.

17. A method comprising:

locating a sensor tool in a subterranean cavity defined within a borehole extending in a formation, the sensor tool being exposed to ambient borehole fluid;

exposing the sensor tool to predefined activation conditions in the ambient borehole fluid to trigger actuated activation of an anchoring mechanism forming part of the sensor tool by causing failure of a frangible closure due to exposure to the ambient borehole fluid at a pressure exceeding a predetermined activation threshold pressure, the activated anchoring mechanism being mechanically coupled with a wall of the cavity to secure the sensor tool in position within the cavity; and detecting seismic activity within the formation by operation of a seismic sensor that forms part of the sensor tool and that is mechanically coupled to the formation via the anchoring mechanism.

18. The method of claim 17, wherein:

the cavity in which the sensor tool is located is provided by an annular space defined between, on the one hand, a radially inner cavity wall provided by a radially outer surface of a hollow cylindrical casing extending co-axially along the borehole, and, on the other hand, a radially outer cavity wall provided by a radially inwardly facing cylindrical borehole wall, and wherein the anchoring mechanism is configured for securing the sensor tool in position within the annular cavity by actuated engagement of the anchoring mechanism with one or more of the cavity walls such that the anchoring mechanism provides a contact coupling between the tool of the body and the borehole wall, the actuator being configured for continuously urging the anchoring mechanism against the one or more cavity walls, to provide a persistent contact coupling of the seismic sensor to the formation.

19. The method of claim 18, further comprising:

locating a plurality of sensor tools in the annular space about the casing; and causing pressure-triggered hydraulic actuation of the respective anchoring mechanisms of the plurality of sensor tools, thereby securing each sensor tool in a respective position such that the plurality of sensor tools are arranged in an array of sensor tools about the casing, each of the secured sensor tools providing for a mechanical contact link between the formation and a respective seismic sensor incorporated in the sensor tool.

20. The method of claim 19, further comprising:

filling at least that a part of the cavity in which the array is secured with a settable material; and allowing setting of the settable material, thereby to embed the array of sensor tools in a jacket of solid material that extends radially between the casing and the formation.

* * * * *